US012670053B2

(12) United States Patent
Parab et al.

(10) Patent No.: US 12,670,053 B2
(45) Date of Patent: Jun. 30, 2026

(54) DETECTING FAILURES IN SENSOR DEVICE SETTINGS

(71) Applicant: NVIDIA CORPORATION, Santa Clara, CA (US)

(72) Inventors: Nikhil Parab, Santa Clara, CA (US); Animesh Khemka, Santa Clara, CA (US); Samuel Hung, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 58 days.

(21) Appl. No.: 18/424,341

(22) Filed: Jan. 26, 2024

(65) Prior Publication Data

US 2025/0245087 A1     Jul. 31, 2025

(51) Int. Cl.
*G06F 11/00* (2006.01)
*G06F 11/07* (2006.01)
*G06F 11/30* (2006.01)

(52) U.S. Cl.
CPC ...... *G06F 11/0772* (2013.01); *G06F 11/3072* (2013.01)

(58) Field of Classification Search
None
See application file for complete search history.

(56) References Cited

U.S. PATENT DOCUMENTS 6,804,600 B1 * 10/2004 Uluyol ..................... G05B 9/02
701/100

OTHER PUBLICATIONS

Google Scholar/Patents search—text refined (Year: 2025).*
Google Scholar/Patents search—text refined (Year: 2026).*

* cited by examiner

*Primary Examiner* — Christopher S McCarthy
(74) *Attorney, Agent, or Firm* — Squire Patton Boggs LLP; Sarah Mirza

(57)     ABSTRACT

In various examples, a technique for verifying sensor settings is disclosed that includes receiving, from a sensor, sensor output data and at least one sensor output setting associated with the sensor output data. The technique further includes determining whether a queue of pending sensor input settings includes a matching sensor input setting that matches the sensor output setting. The technique also includes, in response to determining that the queue of pending sensor input settings includes the matching sensor input setting, identifying, in the queue of pending sensor input settings, a pending sensor input setting that precedes the matching sensor input setting in the queue. The technique further includes determining, based on a pending request count associated with the pending input setting, whether a sensor setting failure has occurred. The technique still further includes generating an error indication based on the pending request count.

20 Claims, 18 Drawing Sheets

400

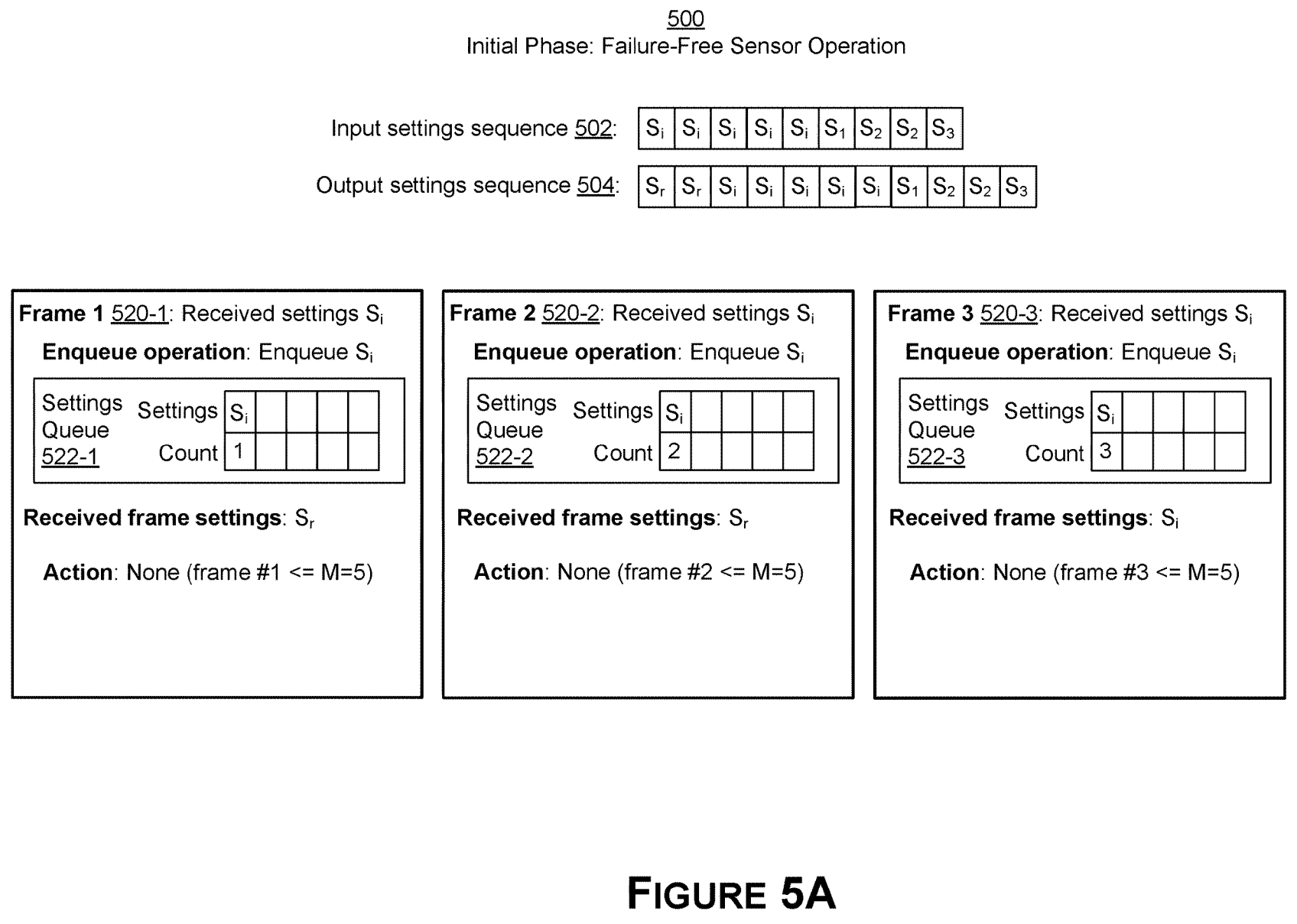

500

Initial Phase: Failure-Free Sensor Operation

Input settings sequence 502: | $S_i$ | $S_i$ | $S_i$ | $S_i$ | $S_1$ | $S_2$ | $S_3$ |

Output settings sequence 504: | $S_r$ | $S_r$ | $S_i$ | $S_i$ | $S_1$ | $S_2$ | $S_3$ |

Frame 1 520-1: Received settings $S_i$

Enqueue operation: Enqueue $S_i$

| Settings Queue 522-1 | Settings | $S_i$ | | |
|---|---|---|---|---|
| | Count | 1 | | |

Received frame settings: $S_r$

Action: None (frame #1 <= M=5)

Frame 2 520-2: Received settings $S_i$

Enqueue operation: Enqueue $S_i$

| Settings Queue 522-2 | Settings | $S_i$ | | |
|---|---|---|---|---|
| | Count | 2 | | |

Received frame settings: $S_r$

Action: None (frame #2 <= M=5)

Frame 3 520-3: Received settings $S_i$

Enqueue operation: Enqueue $S_i$

| Settings Queue 522-3 | Settings | $S_i$ | | |
|---|---|---|---|---|
| | Count | 3 | | |

Received frame settings: $S_i$

Action: None (frame #3 <= M=5)

FIGURE 5A

Frame 4 520-4: Received settings $S_i$
Enqueue operation: Enqueue $S_i$

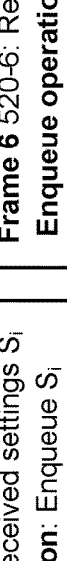

| Settings Queue 522-4 | Settings | $S_i$ |
|---|---|---|
| | Count | 4 |

Received frame settings: $S_i$
Action: None (frame #4 <= M=5)

---

Frame 5 520-5: Received settings $S_i$
Enqueue operation: Enqueue $S_i$

| Settings Queue 522-5 | Settings | $S_i$ |
|---|---|---|
| | Count | 5 |

Received frame settings: $S_i$
Action: None (frame #5 <= M=5)

---

Frame 6 520-6: Received settings $S_1$
Enqueue operation: Enqueue $S_1$

| Settings Queue 522-6 | Settings | $S_i$ | $S_1$ |
|---|---|---|---|
| | Count | 5 | 1 |

Received frame settings: $S_i$
Action: Decrement counter $S_i$

| Settings Queue 524-6 | Settings | $S_i$ | $S_1$ |
|---|---|---|---|
| | Count | 4 | 1 |

Status: OK

---

Frame 7 520-7: Received settings $S_2$
Enqueue operation: Enqueue $S_2$

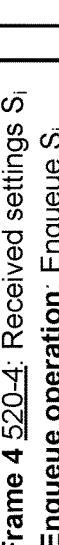

| Settings Queue 522-7 | Settings | $S_i$ | $S_1$ | $S_2$ |
|---|---|---|---|---|
| | Count | 4 | 1 | 1 |

Received frame settings: $S_i$
Action: Decrement counter $S_i$

| Settings Queue 524-6 | Settings | $S_i$ | $S_1$ | $S_2$ |
|---|---|---|---|---|
| | Count | 3 | 1 | 1 |

Status: OK

---

Frame 8 520-8: Received settings $S_2$
Enqueue operation: Enqueue $S_2$

| Settings Queue 522-8 | Settings | $S_i$ | $S_1$ | $S_2$ |
|---|---|---|---|---|
| | Count | 3 | 1 | 2 |

Received frame settings: $S_1$
Action: Decrement counter $S_1$, Dequeue $S_i$

| Settings Queue 524-8 | Settings | ~~$S_i$~~ | $S_1$ | $S_2$ |
|---|---|---|---|---|
| | Count | ~~3~~ | 0 | 2 |

Status: OK

---

Frame 9 520-9: Received settings $S_3$
Enqueue operation: Enqueue $S_3$

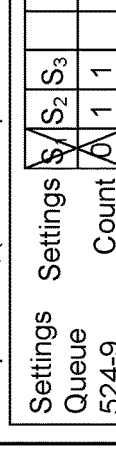

| Settings Queue 522-9 | Settings | $S_1$ | $S_2$ | $S_3$ |
|---|---|---|---|---|
| | Count | 0 | 2 | 1 |

Received frame settings: $S_2$
Action: Decrement counter $S_2$, Dequeue $S_1$ (because precedes $S_2$)

| Settings Queue 524-9 | Settings | ~~$S_1$~~ | $S_2$ | $S_3$ |
|---|---|---|---|---|
| | Count | ~~0~~ | 1 | 1 |

Status: OK (match index=0)

FIGURE 5B

Figure 5C:
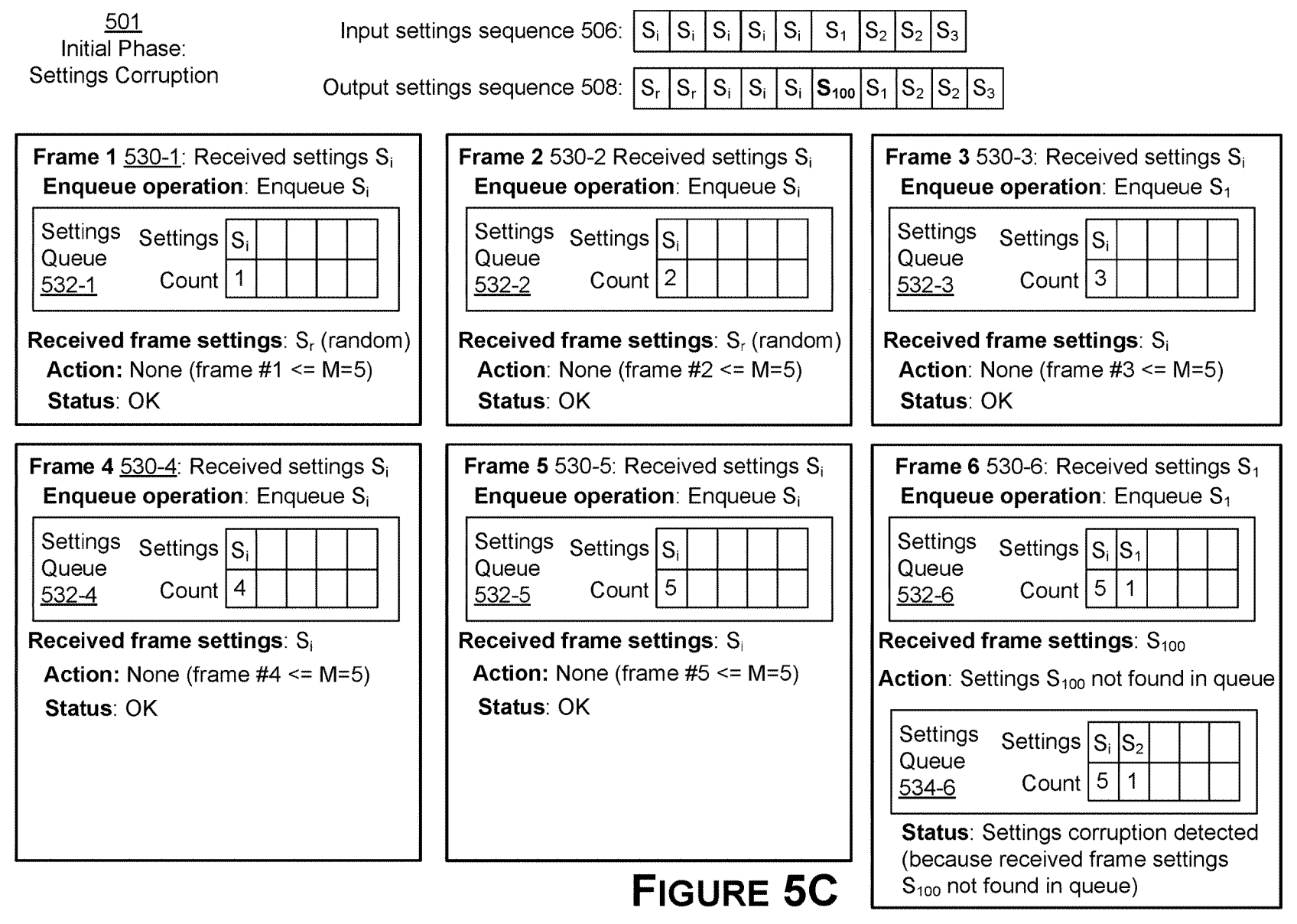

501
Initial Phase:
Settings Corruption

Input settings sequence 506:

| $S_i$ | $S_i$ | $S_i$ | $S_i$ | $S_i$ | $S_2$ | $S_3$ |
|---|---|---|---|---|---|---|

Output settings sequence 508:

| $S_r$ | $S_r$ | $S_i$ | $S_i$ | $S_{100}$ | $S_1$ | $S_2$ | $S_2$ | $S_3$ |
|---|---|---|---|---|---|---|---|---|

---

Frame 1 530-1: Received settings $S_i$
Enqueue operation: Enqueue $S_i$

Settings
Queue
532-1

| Settings | $S_i$ |
|---|---|
| Count | 1 |

Received frame settings: $S_r$ (random)
Action: None (frame #1 <= M=5)
Status: OK

---

Frame 2 530-2 Received settings $S_i$
Enqueue operation: Enqueue $S_i$

Settings
Queue
532-2

| Settings | $S_i$ |
|---|---|
| Count | 2 |

Received frame settings: $S_r$ (random)
Action: None (frame #2 <= M=5)
Status: OK

---

Frame 3 530-3: Received settings $S_i$
Enqueue operation: Enqueue $S_1$

Settings
Queue
532-3

| Settings | $S_i$ |
|---|---|
| Count | 3 |

Received frame settings: $S_i$
Action: None (frame #3 <= M=5)
Status: OK

---

Frame 4 530-4: Received settings $S_i$
Enqueue operation: Enqueue $S_i$

Settings
Queue
532-4

| Settings | $S_i$ |
|---|---|
| Count | 4 |

Received frame settings: $S_i$
Action: None (frame #4 <= M=5)
Status: OK

---

Frame 5 530-5: Received settings $S_i$
Enqueue operation: Enqueue $S_i$

Settings
Queue
532-5

| Settings | $S_i$ |
|---|---|
| Count | 5 |

Received frame settings: $S_i$
Action: None (frame #5 <= M=5)
Status: OK

---

Frame 6 530-6: Received settings $S_1$
Enqueue operation: Enqueue $S_1$

Settings
Queue
532-6

| Settings | $S_i$ | $S_1$ |
|---|---|---|
| Count | 5 | 1 |

Received frame settings: $S_{100}$
Action: Settings $S_{100}$ not found in queue Settings
Queue
534-6

| Settings | $S_i$ | $S_2$ |
|---|---|---|
| Count | 5 | 1 |

Status: Settings corruption detected
(because received frame settings
$S_{100}$ not found in queue)

Figure 6A:
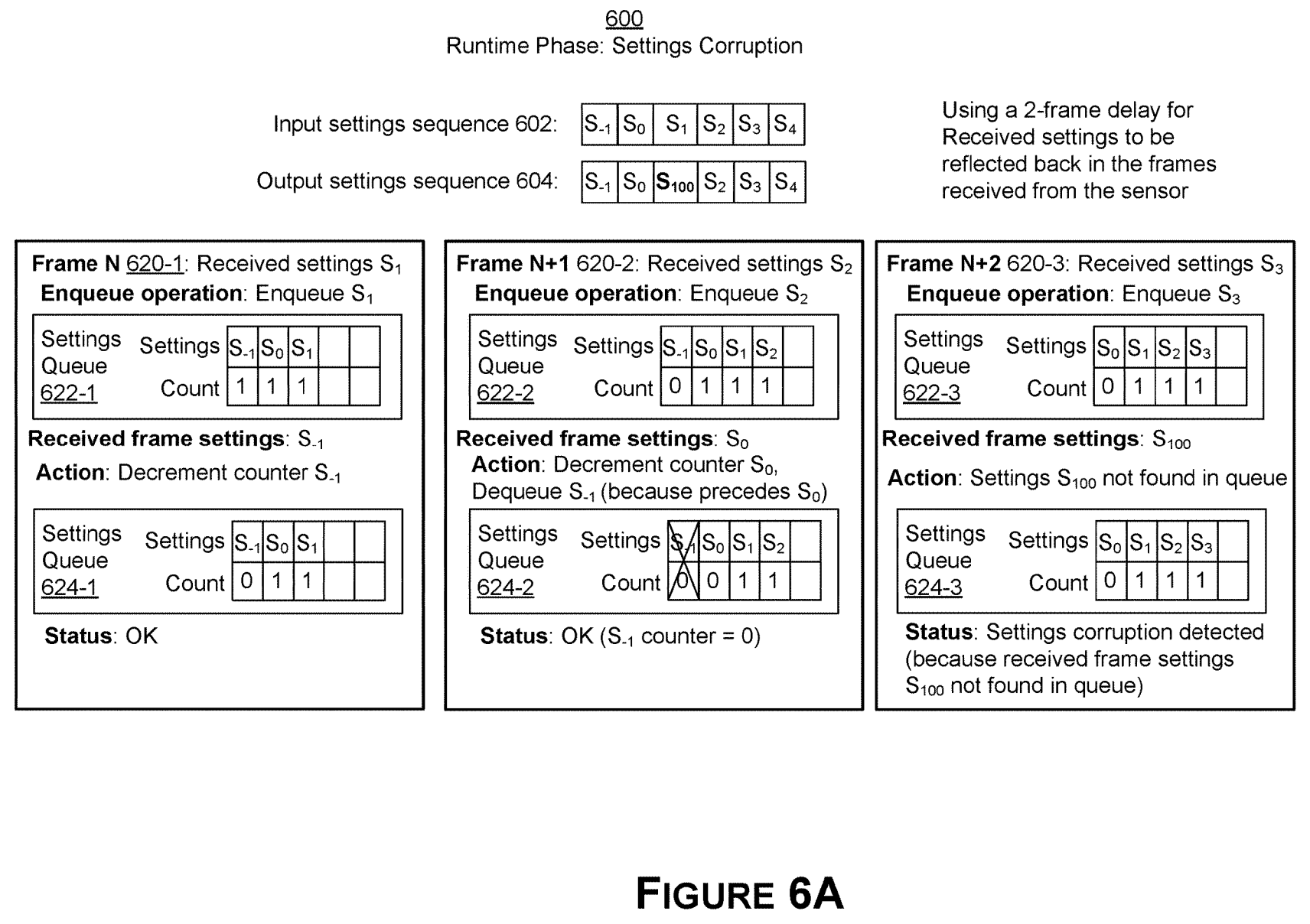

Runtime Phase: Settings Corruption

Input settings sequence 602: | $S_{-1}$ | $S_0$ | $S_1$ | $S_2$ | $S_3$ | $S_4$ |

Output settings sequence 604: | $S_{-1}$ | $S_0$ | $S_{100}$ | $S_2$ | $S_3$ | $S_4$ |

Using a 2-frame delay for Received settings to be reflected back in the frames received from the sensor

Frame N 620-1: Received settings $S_1$
Enqueue operation: Enqueue $S_1$

Settings Queue 622-1:

| Settings | $S_{-1}$ | $S_1$ |
|---|---|---|
| Count | 1 | 1 |

Received frame settings: $S_{-1}$
Action: Decrement counter $S_{-1}$

Settings Queue 624-1:

| Settings | $S_{-1}$ | $S_1$ |
|---|---|---|
| Count | 0 | 1 |

Status: OK

Frame N+1 620-2: Received settings $S_2$
Enqueue operation: Enqueue $S_2$ Settings Queue 622-2:

| Settings | $S_{-1}$ | $S_0$ | $S_1$ | $S_2$ |
|---|---|---|---|---|
| Count | 0 | 1 | 1 | 1 |

Received frame settings: $S_0$
Action: Decrement counter $S_0$, Dequeue $S_{-1}$ (because precedes $S_0$)

Settings Queue 624-2:

| Settings | $S_{-1}$ | $S_0$ | $S_1$ | $S_2$ |
|---|---|---|---|---|
| Count | 0 | 0 | 1 | 1 |

Status: OK ($S_{-1}$ counter = 0)

Frame N+2 620-3: Received settings $S_3$
Enqueue operation: Enqueue $S_3$ Settings Queue 622-3:

| Settings | $S_0$ | $S_1$ | $S_2$ | $S_3$ |
|---|---|---|---|---|
| Count | 0 | 1 | 1 | 1 |

Received frame settings: $S_{100}$ not found in queue
Action: Settings $S_{100}$ not found in queue Settings Queue 624-3:

| Settings | $S_0$ | $S_1$ | $S_2$ | $S_3$ |
|---|---|---|---|---|
| Count | 0 | 1 | 1 | 1 |

Status: Settings corruption detected (because received frame settings $S_{100}$ not found in queue)

Runtime Phase: Settings Delay

Input settings sequence 606: | $S_{-1}$ | $S_0$ | $S_1$ | $S_2$ | $S_3$ | $S_4$ | $S_5$ |

Received settings sequence 608: | $S_{-1}$ | $S_0$ | $S_1$ | $S_2$ | $S_3$ |    $S_2$ delayed by 1 frame

Frame N 630-1: Received settings $S_1$
Enqueue operation: Enqueue $S_1$

Settings Queue 632-1:

| Settings | $S_{-1}$ | $S_0$ | $S_1$ |
|---|---|---|---|
| Count | 1 | 1 | 1 |

Received frame settings: $S_{-1}$
Action: Decrement counter $S_{-1}$

Settings Queue 634-1:

| Settings | $S_{-1}$ | $S_0$ | $S_1$ |
|---|---|---|---|
| Count | 0 | 1 | 1 |

Status: OK (match index=0)

Frame N+1 630-2: Received settings $S_2$
Enqueue operation: Enqueue $S_2$ Settings Queue 632-2:

| Settings | $S_{-1}$ | $S_0$ | $S_1$ | $S_2$ |
|---|---|---|---|---|
| Count | 0 | 1 | 1 | 1 |

Received frame settings: $S_0$
Action: Decrement counter $S_0$, Dequeue $S_{-1}$ (because precedes $S_0$)

Settings Queue 634-2:

| Settings | $S_{-1}$ | $S_0$ | $S_1$ | $S_2$ |
|---|---|---|---|---|
| Count | 0 | 0 | 1 | 1 |

Status: OK ($S_{-1}$ counter = 0)

Frame N+2 630-3: Received settings $S_3$
Enqueue operation: Enqueue $S_3$ Settings Queue 632-3:

| Settings | $S_0$ | $S_1$ | $S_2$ | $S_3$ |
|---|---|---|---|---|
| Count | 0 | 1 | 1 | 1 |

Received frame settings: $S_1$
Action: Decrement counter $S_1$, Dequeue $S_0$ (because precedes $S_1$)

Settings Queue 634-3:

| Settings | $S_0$ | $S_1$ | $S_2$ | $S_3$ |
|---|---|---|---|---|
| Count | 0 | 0 | 1 | 1 |

Status: OK ($S_0$ counter = 0)

Frame N+3 630-4: Received settings $S_4$
Enqueue operation: Enqueue $S_4$ Settings Queue 632-4:

| Settings | $S_1$ | $S_2$ | $S_3$ | $S_4$ |
|---|---|---|---|---|
| Count | 0 | 1 | 1 | 1 |

Received frame settings: $S_1$
Action: Decrement counter $S_1$

Settings Queue 634-4:

| Settings | $S_1$ | $S_2$ | $S_3$ | $S_4$ |
|---|---|---|---|---|
| Count | -1 | 1 | 1 | 1 |

Status: OK

Frame N+4 630-5: Received settings $S_5$
Enqueue operation: Enqueue $S_5$ Settings Queue 632-5:

| Settings | $S_1$ | $S_2$ | $S_3$ | $S_4$ | $S_5$ |
|---|---|---|---|---|---|
| Count | -1 | 1 | 1 | 1 | 1 |

Received frame settings: $S_2$
Action: Decrement counter $S_2$, Dequeue $S_1$ Settings Queue 634-5:

| Settings | $S_1$ | $S_2$ | $S_3$ | $S_4$ | $S_5$ |
|---|---|---|---|---|---|
| Count | -1 | 0 | 1 | 1 | 1 |

Status: Settings update delay (because $S_1$ counter < 0 and next queue element $S_2$ counter = 0)

Using a 2-frame delay for Received settings to be reflected back in the frames received from the sensor

Figure 6C:
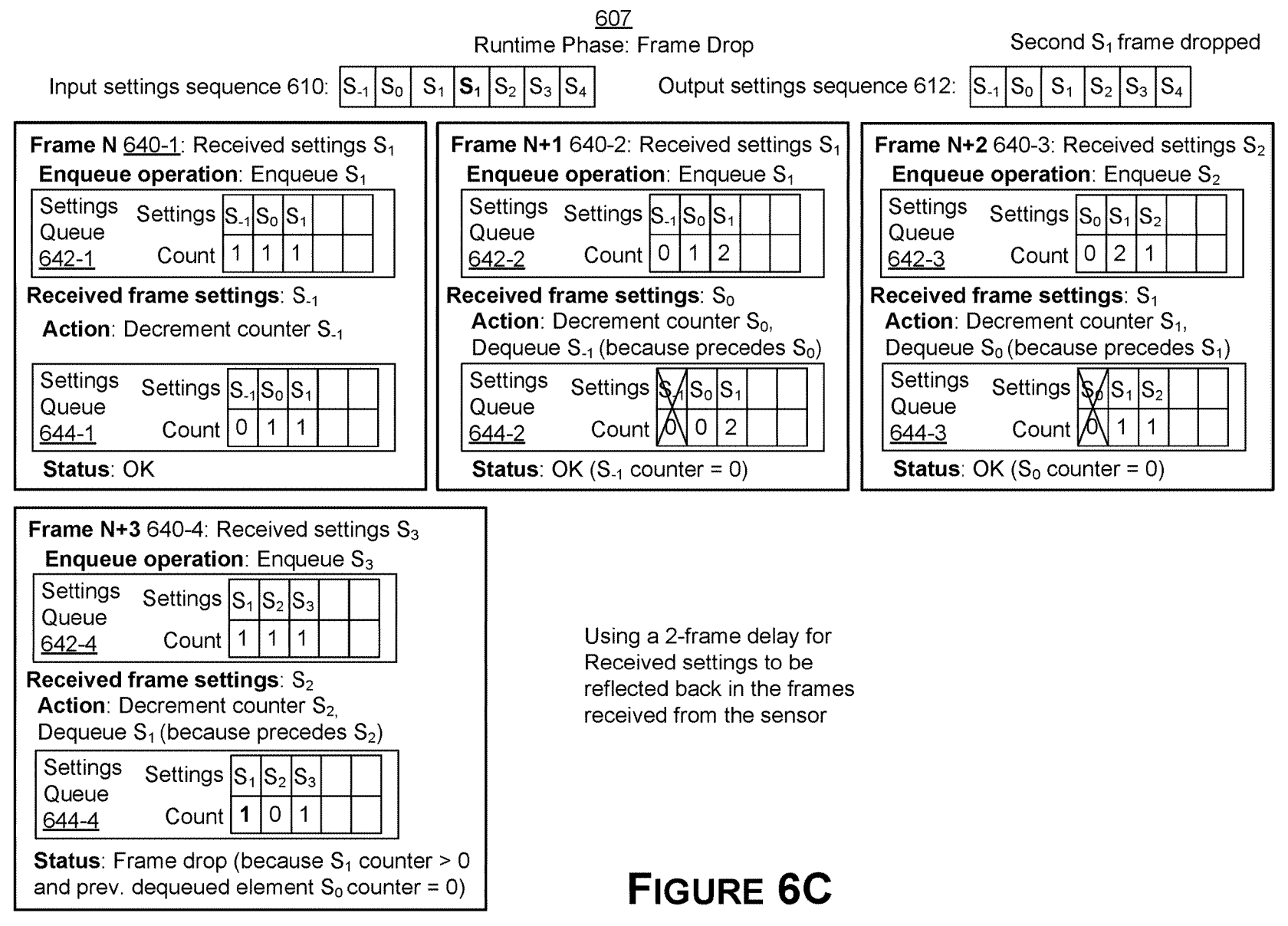

Runtime Phase: Frame Drop

Second $S_1$ frame dropped

Input settings sequence 610: $S_{-1}$ $S_0$ $S_1$ $S_1$ $S_2$ $S_3$ $S_4$

Output settings sequence 612: $S_{-1}$ $S_0$ $S_1$ $S_2$ $S_3$ $S_4$

Frame N 640-1: Received settings $S_1$

Enqueue operation: Enqueue $S_1$

Settings Queue 642-1:

| Settings | $S_{-1}$ | $S_0$ | $S_1$ |
|---|---|---|---|
| Count | 1 | 1 | 1 |

Received frame settings: $S_{-1}$

Action: Decrement counter $S_{-1}$

Settings Queue 644-1:

| Settings | $S_{-1}$ | $S_0$ | $S_1$ |
|---|---|---|---|
| Count | 0 | 1 | 1 |

Status: OK

Frame N+1 640-2: Received settings $S_1$

Enqueue operation: Enqueue $S_1$

Settings Queue 642-2:

| Settings | $S_{-1}$ | $S_0$ | $S_1$ |
|---|---|---|---|
| Count | 0 | 1 | 2 |

Received frame settings: $S_0$

Action: Decrement counter $S_0$, Dequeue $S_{-1}$ (because precedes $S_0$)

Settings Queue 644-2:

| Settings | $S_{-1}$ | $S_0$ | $S_1$ |
|---|---|---|---|
| Count | 0 | 0 | 2 |

Status: OK ($S_{-1}$ counter = 0)

Frame N+2 640-3: Received settings $S_2$

Enqueue operation: Enqueue $S_2$

Settings Queue 642-3:

| Settings | $S_0$ | $S_1$ | $S_2$ |
|---|---|---|---|
| Count | 0 | 2 | 1 |

Received frame settings: $S_1$

Action: Decrement counter $S_1$, Dequeue $S_0$ (because precedes $S_1$)

Settings Queue 644-3:

| Settings | $S_0$ | $S_1$ | $S_2$ |
|---|---|---|---|
| Count | 0 | 1 | 1 |

Status: OK ($S_0$ counter = 0)

Frame N+3 640-4: Received settings $S_3$

Enqueue operation: Enqueue $S_3$

Settings Queue 642-4:

| Settings | $S_1$ | $S_2$ | $S_3$ |
|---|---|---|---|
| Count | 1 | 1 | 1 |

Received frame settings: $S_2$

Action: Decrement counter $S_2$, Dequeue $S_1$ (because precedes $S_2$)

Settings Queue 644-4:

| Settings | $S_1$ | $S_2$ | $S_3$ |
|---|---|---|---|
| Count | 1 | 0 | 1 |

Status: Frame drop (because $S_1$ counter > 0 and prev. dequeued element $S_0$ counter = 0)

Using a 2-frame delay for Received settings to be reflected back in the frames received from the sensor

SERVER(S) 778

CPU 780(B)

PCIE SWITCH 782(D)

PCIE SWITCH 782(C)

GPU 784(F)

GPU 784(H)

GPU 784(E)

GPU 784(G)

CPU 780(A)

PCIE SWITCH 782(B)

PCIE SWITCH 782(A)

786

GPU 784(B)

GPU 784(D)

GPU 784(A)

GPU 784(C)

788

700

794

792

NETWORK(S) 790

900

DETECTING FAILURES IN SENSOR DEVICE SETTINGS

BACKGROUND

An autonomous or semi-autonomous vehicle is typically equipped with cameras, depth sensors, and/or other sensors that are used to detect and understand the environment around the vehicle. Data collected by the sensors is used by downstream components to make important decisions related to stopping the vehicle, starting the vehicle, controlling the speed of the vehicle, determining a path to be taken by the vehicle, disengaging an autonomous driving mode on the vehicle, and/or otherwise operating the vehicle. The accuracy of sensors in particular conditions can be dependent on proper configuration of the sensors. A sensor can accept one or more settings, which can be particular values that configure operation of the sensor. The term "sensor setting" herein may refer to a set of one or more settings values that can be sent to a set of sensors individually and/or as a group, e.g., in a single configuration request. The settings values can be values of configuration parameters for the sensor. As an example, a camera has an exposure parameter that controls the amount of time for which the camera sensor is exposed to light, and a gain parameter that controls the amount of amplification applied to pixels captured by the camera sensor. The appropriate values for the exposure and gain parameters depend on various factors, including characteristics of the scene being captured by the camera. Sensor settings for a camera, also referred to herein as camera settings, can be particular values for the exposure and gain parameters, e.g., 25 milliseconds and 10×, for example.

Sensor settings can be sent to the sensor from other system components. A sensor controller, for example, can determine appropriate sensor settings and send the sensor settings to the sensor. For example, the sensor can have a configuration interface that receives the particular settings, and the sensor controller can send the settings to the configuration interface to cause the sensor to use the sensor settings. Upon receiving a specified set of settings, the sensor configures the corresponding parameters to have the specified set of sensor settings. The operations of sending sensor settings to the sensor and/or configuring the sensor to use the sensor settings are referred to herein as applying the sensor settings to the sensor. After the sensor settings are applied, the sensor operates in accordance with the settings. The sensor then receives information about the environment and generates detection information in accordance with the sensor settings.

As an example, a camera controller determines appropriate values for the camera exposure and gain settings based on scene statistics of a current image recently captured by the camera and previous camera settings that were sent to the camera prior to capturing the current image. The camera controller can perform continuous auto exposure (CAE), which involves determining camera exposure and gain settings to achieve optimized brightness in images captured by the camera. The camera controller applies the determined camera settings to the camera by sending the settings to the camera. If the camera settings are successfully applied to the camera, then the camera uses the specified settings when capturing images.

A failure to apply sensor settings can occur as a result of unexpected conditions or behavior, such as failure of hardware or software to operate correctly, e.g., according to specifications. Failure to apply the settings can result in incorrect results, such as inaccurate images being captured by the camera. A failure of a system component involved in sending and/or configuring the sensor to use the settings, for example, can cause a failure to apply sensor settings. System components that can cause failure to apply sensor settings if not operating correctly include the camera controller, a communication bus, or the sensor. A failure of the sensor, such as the sensor not accepting the settings, can occur without generating an error notification or other specific indication that a failure has occurred. Failure to apply sensor settings can also include applying different sensor settings than those specified to the sensor, in which case the sensor can produce incorrect output.

Applications such as automotive systems have requirements for accurate and timely sensor output. Consequently, accurately and efficiently verifying that sensor settings have been applied is critical to reliable autonomous or semi-autonomous operation and navigation. For example, failure to correctly apply an exposure time setting to a camera in an automotive system can result in captured images that are underexposed or overexposed and thus do not clearly depict objects that are present in the environment. Such inaccurate or otherwise erroneous sensor data can cause the downstream components to incorrectly or fail to identify objects in the environment around the vehicle and result in incorrect or improper driving decisions.

One approach that has been implemented to verify that sensor settings have been correctly applied to a sensor involves storing a copy of the "input" settings that are sent to the sensor. When the sensor output is received, the "output" settings, which are provided as part of the sensor output, are compared to the stored copy of the input settings. If the input settings do not match the output settings within a threshold level of error tolerance, then the input settings were not applied to the sensor, or if applied, were not applied correctly. The threshold level of error tolerance is based on an expected amount of quantization error produced by the conversion of the input settings to a quantized value in the sensor. The input settings, e.g., exposure and/or gain, can be rounded to different "quantized" values by the sensor because of the limited number of bits available to represent such settings (or available to represent values that influence such settings). The sensor uses the quantized values for the settings, so the quantized values are provided by the sensor as the output settings that represent the settings used in generating the sensor output. Since the output settings can differ from the input settings by the quantization error, the quantization error is used as an error tolerance (e.g., acceptable amount of difference) between the output settings and the stored copy of the input settings when verifying that the input settings were correctly applied to the camera.

However, this existing approach is not effective when numerous different sets of settings are used, since maintaining a copy of each set of settings uses additional memory storage and computation time, and thus is not scalable to larger numbers of settings. Larger numbers of settings are used by continuous auto exposure algorithms, for example, which dynamically generate different sensor settings based on changes in the input image. Thus, the effectiveness of existing approaches diminishes as the number of different settings increases beyond a fixed number.

Further, existing approaches use a fixed error tolerance (e.g., a fixed percentage threshold) to determine whether output settings match the input settings. In existing approaches, the stored copy of the input settings is associated with or modified based on a particular sensor quantization error that corresponds to the input settings. However, when numerous different sets of settings are used, the error tolerance (e.g., percentage) is different for each different set of sensor settings because different settings can have different amounts of quantization error introduced by the sensor. Continuously generated sensor settings, as used in continuous auto exposure, for example, undergo variable quantization over a range of sensor gain and exposure. Adjusting the error tolerance for each different set of sensor settings to account for the different sensor quantization error is impractical. An example, a fixed set of settings can contain five settings, and a fixed set error tolerance, such as 5%, can be associated with the five settings. However, with continuously generated sensor settings, the percentage error tolerance changes with the sensor settings. For example, lower gain and exposure settings can have a lower error tolerance, but the higher gain and exposure settings can have a greater error tolerance. Thus, fixed tolerance is not effective for that range of the lower settings to the higher settings. The fixed tolerance approach is thus not effective when the settings change over time, as occurs when using continuous auto exposure to adjust sensor settings. Thus, existing approaches are insufficient for verifying that numerous sensor settings such as those used for continuous auto exposure, have been correctly applied within an acceptable amount of time.

As such, a need exists for more effective techniques for verifying that sensor settings have been applied correctly in, for example, autonomous or semi-autonomous systems.

SUMMARY

Embodiments of the present disclosure relate to a technique for verifying sensor settings. The technique includes receiving, from a sensor, sensor output data and at least one sensor output setting associated with the sensor output data. The technique further includes determining whether a queue of pending sensor input settings includes a matching sensor input setting that matches the sensor output setting. The technique also includes, in response to determining that the queue of pending sensor input settings includes the matching sensor input setting, identifying, in the queue of pending sensor input settings, a pending sensor input setting that precedes the matching sensor input setting in the queue. The technique further includes determining, based on a pending request count associated with the pending input setting, whether a sensor setting failure has occurred. The technique still further includes generating an error indication based on the pending request count.

One technical advantage of the disclosed techniques relative to the prior solutions is the ability to detect failure to apply sensor settings when numerous different settings are applied, as occurs when using continuous auto exposure, for example. Another technical advantage of the disclosed techniques is the ability to identify and report the failure mode. Failure modes that can be detected include data corruption, dropped settings that were sent but not used by the sensor, or dropped output frames that were not received from the sensor. The identified failure mode can be used to find the cause of the failure and take corrective action. These technical advantages represent one or more technological improvements over existing approaches.

BRIEF DESCRIPTION OF THE DRAWINGS

The present systems and methods for securely detecting changes in data in autonomous or semi-autonomous systems and applications are described in detail below with reference to the attached drawing figures, wherein:

FIGS. 5A and 5B illustrate an example execution of an initial phase of a sensor failure detector in failure-free operation of sensor system, in accordance with some embodiments of the present disclosure;

FIG. 5C illustrates an example execution of an initial phase of a sensor failure detector when sensor settings corruption occurs, in accordance with some embodiments of the present disclosure;

FIG. 6A illustrates an example execution of a runtime phase of a sensor failure detector when sensor settings corruption occurs, in accordance with some embodiments of the present disclosure;

FIG. 6B illustrates an example execution of a runtime phase of a sensor failure detector when a sensor settings delay occurs, in accordance with some embodiments of the present disclosure;

FIG. 6C illustrates an example execution of a runtime phase of a sensor failure detector when a sensor output frame drop occurs, in accordance with some embodiments of the present disclosure;

DETAILED DESCRIPTION

Systems and methods are disclosed for detecting sensor settings failures in an autonomous or semi-autonomous vehicle or machine. Although the present disclosure may be described with respect to an example autonomous or semi-autonomous vehicle or machine 700 (alternatively referred to herein as "vehicle 700" or "ego-machine 700," an example of which is described with respect to FIGS. 7A-5D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to monitoring sensor performance in autonomous and/or semi-autonomous vehicles, this is not intended to be limiting, and the systems and methods described herein may be used in augmented reality, virtual reality, mixed reality, robotics, security and surveillance, autonomous or semi-autonomous machine applications, and/or any other technology spaces where sensor monitoring may be used.

Figure 1:
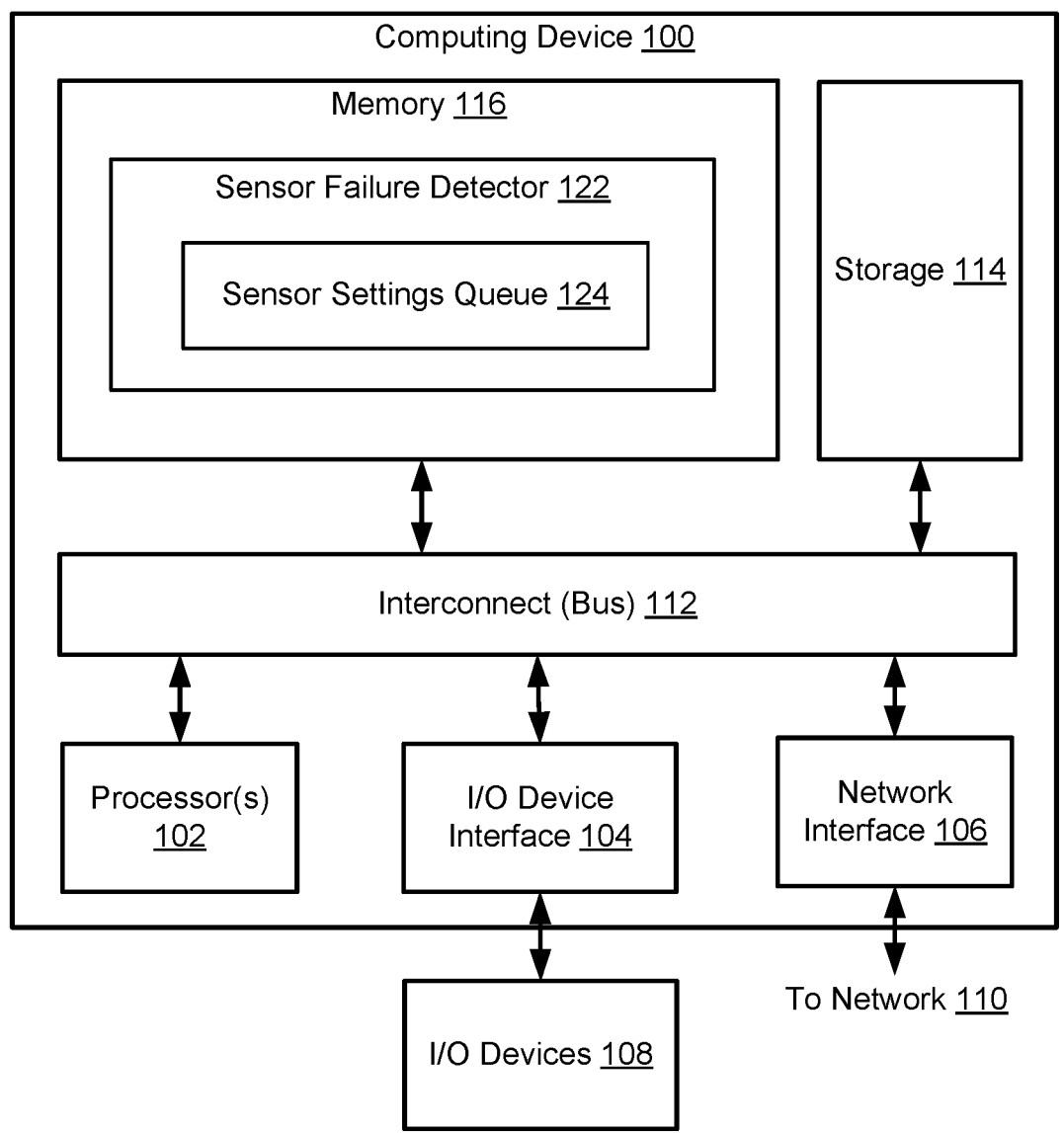
FIG. 1 illustrates a computing device configured to implement one or more aspects of various embodiments.

FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, one or more virtual machines, an embedded system, an embedded hardware module that includes a system on a chip, a system on a chip, a computing system of an autonomous, semi-autonomous, or a non-autonomous machine, and/or any other type of computing device configured to receive input, process data, and optionally display images, and is suitable for practicing one or more embodiments. The computing device 100 includes a memory 116, one or more processors 102, an interconnect 112, storage 114, an Input/Output (I/O) device interface 104, and a network interface 106. The computing device 100 also includes and/or communicates with one or more I/O device(s) 108. The I/O device(s) 108 communicate with the interconnect 112 via the I/O device interface 104. The memory 116 can be a volatile random-access memory or other suitable type of memory.

In particular embodiments, a sensor failure detector 122 is stored in the memory 116. The sensor failure detector 122 detects and reports failures in applying sensor settings to sensors such as cameras, LIDAR sensors, RADAR sensors, or other type of sensor that can be configured by application of settings. To configure a sensor with an input setting, a system, such as a control system or a perception system for an autonomous or semi-autonomous machine, generates the input setting, e.g., based on characteristics of the environment such as light levels, and requests that the input setting be applied to the sensor to cause the sensor to operate in accordance with the input setting. For example, a control system can send a sensor configuration request that includes the input setting to the sensor. If no failures occur, the input setting is applied to the sensor, and the sensor operates in accordance with one or more settings values that are included in the input setting. Applying the input setting can involve configuring the sensor to use the input setting, for example. The sensor subsequently generates one or more sensor output frames. Each sensor output frame includes captured data, which is generated by the sensor based on stimuli received by the sensor. For example, if the sensor is a camera, the captured data can include images of the environment captured by the sensor. In other examples, if the sensor is a RADAR or LIDAR sensor, the captured data can include a representation of detections, such as a point cloud or distances and directions to detected objects. Each sensor output frame also includes an output setting, which specifies the setting that was used by the sensor to capture the captured data. The output setting can be different from the input setting, since the sensor can adjust the input setting prior to capturing data. For example, a settings value in the input setting can be rounded to different "quantized" values by the sensor because of the limited number of bits available to represent the settings value. The sensor uses the quantized values for the setting value, so the quantized value is provided by the sensor in the output setting that represents the setting used in generating the sensor output.

The sensor failure detector 122 monitors input settings sent to the sensor by a sensor controller or other system component. For example, the sensor failure detector 122 can receive each input setting that is sent to the sensor by a sensor controller or other system component that configures the sensor. The sensor failure detector 122 also monitors output settings, which are received with each output data frame generated by the sensor and indicate the settings used by the sensor to generate the output data frame. For example, the sensor failure detector 122 can receive each output data frame generated by the sensor and extract the output setting from each output data frame.

The sensor failure detector 122 stores each received input setting in a sensor settings queue 124. The sensor settings queue 124 is stored in the memory 116 and can be a first in, first out data structure that contains elements. Each element can be a setting or a data structure that includes an input setting and a count, for example. Each element can be implemented as a reference (e.g., pointer) to an input setting or data structure that contains an input setting and count. The input setting that has been in the queue for the longest amount of time is referred to as the "head" of the queue. The input setting that has been in the queue for the shortest amount of time is referred to as the "tail" of the queue. The sensor failure detector 122 uses the sensor settings queue 124 to detect failures that occur between the sending of an input setting to the sensor and the receipt of an output setting from the sensor. The sensor failure detector 122 identifies particular failure modes (e.g., types of failures) based on the contents of the sensor settings queue 124. Failure modes that can be identified include sensor settings being lost or corrupted in the communication path between the sender (e.g., a sensor controller) and the sensor, sensor settings being corrupted in the sensor, a frame captured by the sensor being dropped in transit to the sensor failure detector 122, sensor data in a captured frame being corrupted in transit to a receiver (e.g., a sensor controller or the sensor failure detector 122), and/or a delay in sensor settings taking effect in the sensor.

Upon receiving an input setting, the sensor failure detector 122 stores the input setting in the settings history queue 124, e.g., by adding the input setting at tail of the queue, and sets a count value associated with the input setting to a value indicating the number of consecutive times the same setting has been sent to the sensor. The sensor failure detector 122 updates the count as input settings are sent and output settings are received so that the count represents a difference between the number of consecutive times the input setting has been sent to the sensor and a number of times an output setting that matches the input setting has been received. For example, the first time the setting is sent to the sensor, the count is set to 1 (or other value indicating that the setting has been sent once). Each time the same input setting is sent to the sensor without a different intervening input setting being sent, the count is incremented by 1 (or other value indicating an increase by one send of the same setting).

Upon receiving an output frame containing an output setting, the sensor failure detector 122 searches for the first, e.g., oldest, input setting in the settings history queue that matches the received output setting within a threshold tolerance. The threshold tolerance accounts for a quantization error introduced by the sensor and can be based on the value of the setting being compared. The threshold tolerance can be determined using a set of settings value ranges, each of which is associated with a different threshold tolerance. The particular threshold tolerance to use for determining whether a particular setting value (e.g., gain) in an input setting matches a corresponding setting value in output setting can be identified by finding the range that includes the particular setting value. The threshold tolerance associated with the identified range is the particular threshold tolerance to use for the particular setting value. As an example, five ranges can be used for the gain setting that can have a value between 1 and 10. A tolerance T1 is associated with a range between 1 and 2, represented by the interval [1, 2). A tolerance T2 is associated with a range between 2 and 4, represented by the interval [2, 4). A tolerance T3 is associated with a range between 4 and 6, represented by the interval [4, 6). A tolerance T4 is associated with a range between 6 and 8, represented by the interval [6, 8). A tolerance T5 is associated with a range between 8 and 10, represented by the interval [8, 10). In this example, an input setting having a gain of 3.5 is in the range associated with tolerance T2. The tolerance can be represented as a tolerance value, in which case an input setting value matches an output setting value if the absolute value of the difference between the input setting value and the output setting value is less than the tolerance value. In another example, the tolerance can be represented as a percentage. If tolerance T2 is 10%, the input setting having the gain 3.5 matches a received output setting having the gain 3.4 because 3.4 is within 10% of 3.5. However, an input setting having the gain 3.5 does not match the received output setting having the gain 3.1, because 3.1 is not within 10% of 3.5. Although the tolerance determination is described using a specific determination technique in the examples herein, the tolerance can be determined based on the input setting and/or the output setting using any suitable determination technique.

If the sensor failure detector 122 does not find a matching input setting in the sensor settings queue 124, then a settings corruption failure has occurred. If a matching input setting is found, then the sensor failure detector 122 decrements the counter of the matching input setting by 1. If the matching input setting is at the head of the queue, then no failure involving the input setting has occurred. Otherwise, the matching input setting is not at the head of the queue, and each non-matching setting preceding the matching setting is removed from the queue.

The count associated with each non-matching setting is compared to 0 (or other value corresponding to 0) to determine whether a failure has occurred. If the count associated with a non-matching setting is 0, then no failure has occurred. If the count of the non-matching setting is less than 0, then a failure has occurred, and the particular type of failure is identified based on the counter of the next setting in the queue. If the counter of the next setting is zero, then a settings update delay has occurred. If the counter of the next setting is zero, then a sensor settings drop has occurred. Further, if the count of the non-matching setting is greater than zero, then a failure has occurred, and the particular type of failure is identified based on the counter of the previous setting in the queue. If the counter of the previous setting is zero, then a frame drop has occurred. If the counter of the previous setting is less than zero, then a sensor settings drop has occurred.

Error information describing the failure mode and associated input setting and/or sensor output frame can then be reported to inform an application or other system component that a sensor data verification error has occurred. The error information can indicate that incorrect sensor data may have been received, or expected sensor data may not have been received, for example. In various embodiments, prior to performing the operations described above, an initial verification phase is used to consume and verify an initial sequence of settings that are generated by the sensor when the sensor is initialized.

It is noted that the computing device described herein is illustrative and that any other technically feasible configurations fall within the scope of the present disclosure. For example, multiple instances of sensor failure detector 122 may execute on a set of nodes in a distributed and/or cloud computing system to implement the functionality of computing device 100. Alternatively, computing device 100 may be implemented similar to that of the computing device of the example autonomous or semi-autonomous machine 700 described at least with respect to FIGS. 7A-7D.

In at least one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a deep learning accelerator (DLA), a parallel processing unit (PPU), a data processing unit (DPU), a vector or vision processing unit (VPU), a programmable vision accelerator (PVA), any other type of processing unit, or a combination of different processing units, such as a CPU(s) configured to operate in conjunction with a GPU(s). In general, processor(s) 102 may include any technically feasible hardware unit capable of processing data and/or executing software applications. Further, in the context of this disclosure, the computing elements shown in computing device 100 may correspond to a physical computing system (e.g., a system in a data center or a machine) and/or may correspond to a virtual computing instance executing within a computing cloud.

In at least one embodiment, I/O devices 108 include devices capable of receiving input, such as a keyboard, a mouse, a touchpad, a VR/MR/AR headset, a gesture recognition system, a steering wheel, mechanical, digital, or touch sensitive buttons or input components, and/or a microphone, as well as devices capable of providing output, such as a display device, haptic device, and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In at least one embodiment, network 110 is any technically feasible type of communications network that allows data to be exchanged between computing device 100 and internal, local, remote, or external entities or devices, such as a web server or another networked computing device. For example, network 110 may include a wide area network (WAN), a local area network (LAN), a wireless (e.g., WiFi) network, and/or the Internet, among others.

In at least one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Processing engine 122 and/or analysis engine 124 may be stored in storage 114 and loaded into memory 116 when executed.

In one embodiment, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs or more generally software code that can be executed by processor(s) 102 and application data associated with said software programs, including processing engine 122 and/or analysis engine 124.

Figure 2:
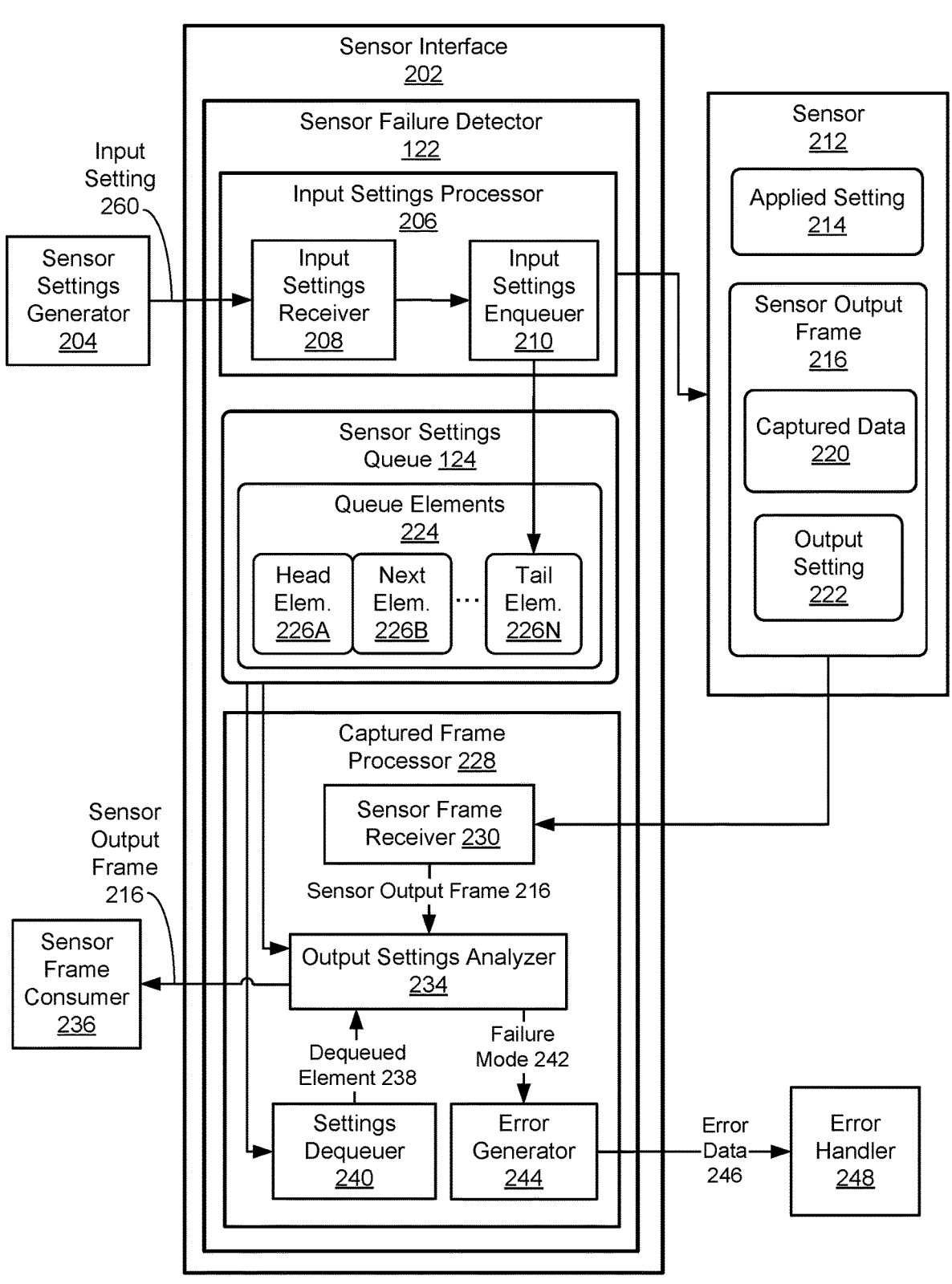
FIG. 2 is a more detailed illustration of the sensor failure detector of FIG. 1, according to various embodiments.

FIG. 2 is a more detailed illustration of the sensor failure detector 122 of FIG. 1, according to various embodiments. As shown, the sensor failure detector 122 is included in a sensor interface 202. The sensor interface 202 is used by a sensor settings generator 204 to send an input setting 260 to a sensor 212, and by a sensor frame consumer 236 to receive a sensor output frame 216. For explanatory purposes, the term "input setting" (singular) is used herein to refer to a set of one or more settings values that can be sent to the sensor 212 as a group, e.g., in a single configuration request. The term "input settings" (plural) herein refers to two or more sets of settings values. For example, two input settings 260 can be sent to a sensor 212 at different times. The sensor settings generator 204 and sensor frame consumer 236 can be components of a sensor controller, application, or other system component (not shown).

The sensor interface 202 includes an input setting processor 206, which processes each input setting 260 by adding the input setting 260 to the sensor settings queue 124. The input setting processor 206 includes an input settings receiver 208 that receives the input setting 260 from the sensor settings generator 204. The input setting processor 206 also includes a settings enqueuer 210, which enqueues the received input setting 260 to a sensor settings queue 124.

The input setting processor 206 also sends the input setting 260 to a sensor 212 to in a request to configure the sensor 212 according to the input setting 260. The sensor 212 receives the input setting 260 and applies the input setting 260 to the configuration of the sensor 212. The result of applying the input setting 260 to the sensor configuration is shown as an applied setting 214. The applied setting 214 can be different from the input setting 260, e.g., if the sensor rounds the values of a setting to a larger or smaller value compatible with the sensor, or if a failure (e.g., data corruption) occurs during configuration of the sensor.

Upon receiving an input setting 260, the input setting processor 206 stores the input setting 260 in the settings history queue 124, e.g., by adding the input setting at tail of the queue, and sets a count value associated with the input setting to a value indicating the number of consecutive times the same setting has been sent to the sensor. For example, the settings enqueuer 210 can add the input setting 260 to the sensor settings queue 124 as a tail element 226N. The tail element 226N can be the input setting 260 or a data structure containing the input setting 260, for example. The sensor settings queue 124 also includes a head element 226A and a next element 226B between the head element 226A and the tail element 226N. Each element 226 in the sensor settings queue 124 can be a different sensor setting.

Since the count value associated with each input setting in the sensor settings queue 124 indicates the number of consecutive times the same setting has been sent to the sensor 212, separate input settings having the same settings values are not stored consecutively in the sensor settings queue 124. The sensor failure detector 122 updates the count associated with each input setting 260 as input settings 260 are sent to the sensor 212 and output settings 222 are received from the sensor 212 so that the count associated with each input setting 260 in the sensor settings queue 124 represents a difference between the number of consecutive times the input setting 260 has been sent to the sensor 212 and a number of times an output setting 222 that matches the input setting 260 has been received from the sensor 212. For example, the first time an input setting 260 is sent to the sensor 212, the count associated with the input setting 260 is set to 1 (or other value indicating that the setting has been sent once). Each time the same input setting 260 is sent to the sensor without a different intervening input setting 260 being sent, the count is incremented by 1 (or other value indicating an increase by one send of the same setting). Alternatively, in other embodiments, each input setting 260 can be stored in the sensor settings queue 124 even if the input setting 260 has the same settings values as another adjacent input setting 260 in the queue, in which case the count value need not be maintained because the number of consecutive occurrences of the input setting in the queue input setting 260 can represent the count value.

The sensor 212 generates a sequence of sensor output frames 216 in response to external stimuli such as light or other electromagnetic waves. Each sensor output frame 216 can include captured data 220, which is generated by the sensor 212 based on external stimuli in accordance with the applied setting 214. The captured data 220 can be a camera image, a point cloud, or other suitable representation of data detected by the sensor 212, for example. The sensor output frame 216 also includes an output setting 222, which includes one or more settings values used by the sensor 212 to capture the captured data 220. The output setting 222 can be different from the applied setting 214. For example, the sensor 212 can round the one or more settings values in the applied setting 214 to respective quantized values because of the limited number of bits available to represent the settings values in the sensor 212. The sensor uses the quantized values for the settings when capturing the captured data 220, so the quantized values are provided by the sensor as the output setting 222 that represents the settings used in generating the captured data 220.

The captured frame processor 228 detects and reports failures that occur in sending or applying input settings 260 to the sensor 212, or in receiving output settings 222 from the sensor 212. The captured frame processor 228 includes a sensor frame receiver 230, which receives each sensor output frame 216 from the sensor 212 and provides the sensor output frame 216 to an output setting analyzer 234. Upon receiving a sensor output frame 216, the output setting analyzer 234 searches the sensor settings queue 124 for the first, e.g., oldest, queue element 226 containing an input setting that matches the output setting 222 contained in or associated with the sensor output frame 216.

In some embodiments, an input setting in the sensor settings queue 124 can match the output setting 222 if each setting value in the input setting is equal to a corresponding setting value for the same parameter in the output setting 222. For example, if the input setting contains the exposure parameter value 25 milliseconds and the gain parameter value 10, then the input setting matches the output setting 222 if the output setting also contains the exposure parameter value 25 milliseconds and the gain parameter value 10. In other embodiments, the input setting matches the output setting 222 if each setting value in the input setting is within a threshold tolerance of a corresponding setting value for the same parameter in the output setting 222. For example, an input setting containing the exposure parameter value 25 milliseconds and the gain parameter value 10 matches an output setting 222 containing the exposure parameter value 26 milliseconds and the gain parameter value 11 within a tolerance threshold of 10%. The threshold tolerance accounts for quantization error introduced by the sensor and can be based on the value of the setting being compared.

If the output setting analyzer 234 does not find a matching input setting, then the 234 determines that a settings corruption failure has occurred and sends a failure mode indicator 242 to an error generator 244. The error generator 244 sends error data 246 identifying the failure mode 242 and further identifying the sensor output frame 216 for which a match was not found to an error handler 248. The error handler 248 can provide the error data 246 to a system component such as a sensor controller or application. The system component can then process the error based on the error data 246. For example, the error handler 248 determines that captured data 220 for which a settings corruption failure occurred is to be discarded without being processed further. The system component then discards the captured data 220 associated with the sensor output frame 216.

If the output setting analyzer 234 finds a matching input setting in the sensor settings queue 124 that matches the output setting 222, then the sensor failure detector 122 decrements the counter associated with the matching input setting by 1. If the matching input setting is at the head of the queue, then no failure involving the input setting has occurred, and the output setting analyzer 234 proceeds to search the sensor settings queue 124 for another input setting that matches the output setting 222. Otherwise, the matching input setting is not at the head of the queue, and a setting dequeuer 240 removes, e.g., dequeues, each non-matching input setting that precedes the matching setting from the sensor settings queue 124.

The output setting analyzer 234 compares the count associated with each dequeued non-matching setting to 0 (or other value corresponding to 0) to determine whether a failure has occurred. If the count associated with a dequeued non-matching setting is 0, then no failure has occurred, and the output setting analyzer 234 proceeds to compare the next dequeued non-matching setting to 0. If the count associated with each of the dequeued non-matching settings is 0, then the output setting analyzer 234 determines that no error involving the dequeued non-matching settings has occurred.

If the output setting analyzer 234 determines that the count associated with a dequeued non-matching setting is less than 0, then a failure has occurred, and the output setting analyzer 234 identifies the particular type of failure based on the counter of the next setting in the queue. The next setting can be the setting adjacent to and behind the dequeued non-matching setting in the queue, for example. If the counter of the next setting is zero, then a settings update delay has occurred. If the counter of the next setting is zero, then a sensor settings drop has occurred.

Further, if the output setting analyzer 234 determines that the count associated with a dequeued non-matching setting is greater than 0, then a failure has occurred, and the output setting analyzer 234 identifies the particular type of failure based on the counter of the previous setting in the queue. The previous setting can be the setting adjacent to and ahead of the dequeued non-matching setting in the queue, for example. If the counter of the previous setting is zero, then a frame drop has occurred. If the counter of the previous setting is less than zero, then a sensor settings drop has occurred. The output setting analyzer 234 sends a failure mode 242 indicating the identified failure mode (e.g., settings update delay, sensor settings drop, or frame drop) to the error generator 244, which sends error data 246 specifying the identified failure mode 242 to the error handler 248.

Figure 3A:
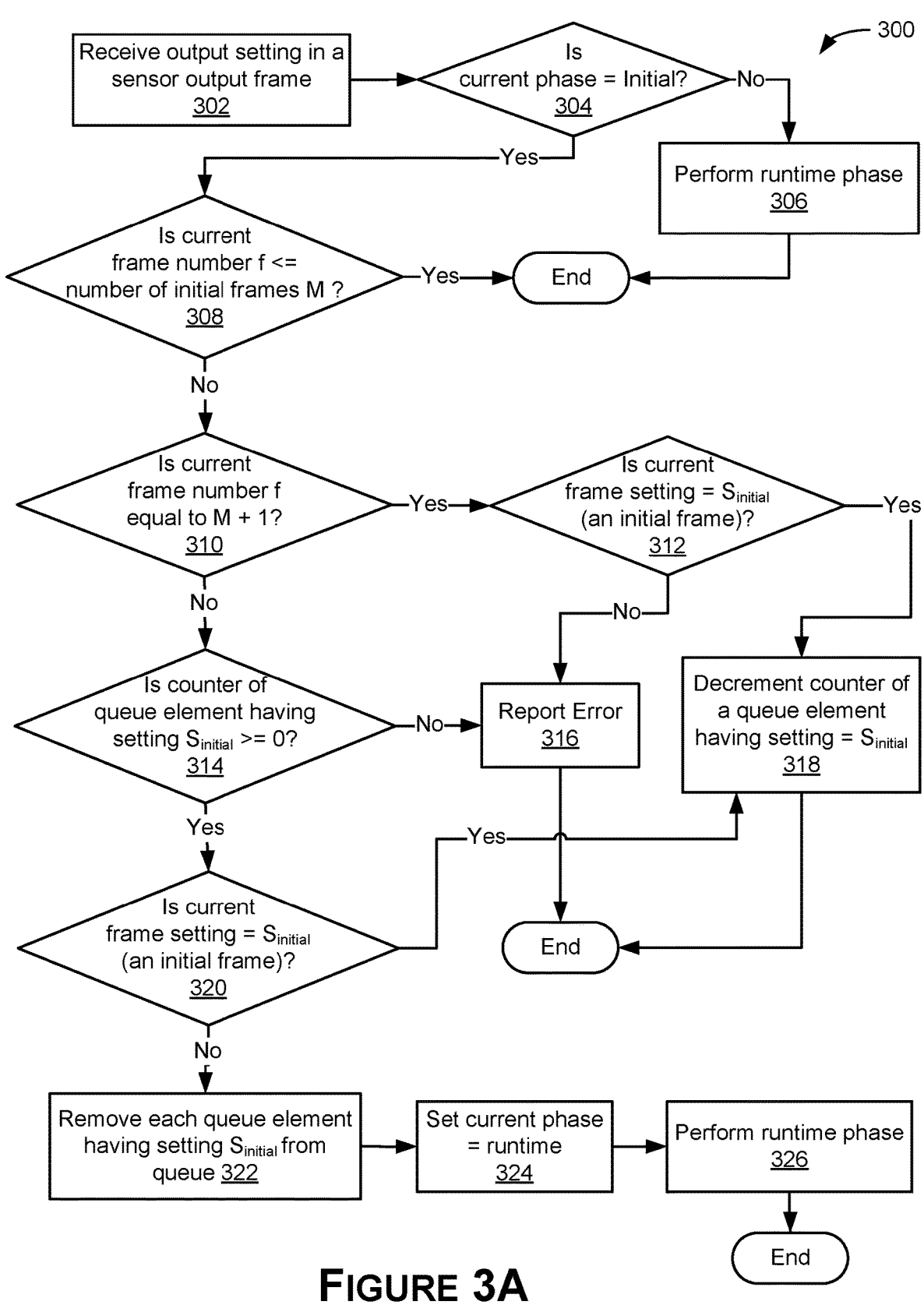
FIG. 3A illustrates a flow diagram of a method for processing settings frames containing initial data from a sensor in an initial phase, according to various embodiments.

FIG. 3A illustrates a flow diagram of a method 300 for processing settings frames containing initial data from a sensor in an initial phase, according to various embodiments. Each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the system of FIGS. 1-2. However, this method may additionally or alternatively be executed by any one system, or any combination of systems, including, but not limited to, those described herein. Further, the operations in method 300 can be omitted, repeated, and/or performed in any order without departing from the scope of the present disclosure.

Figure 3B:
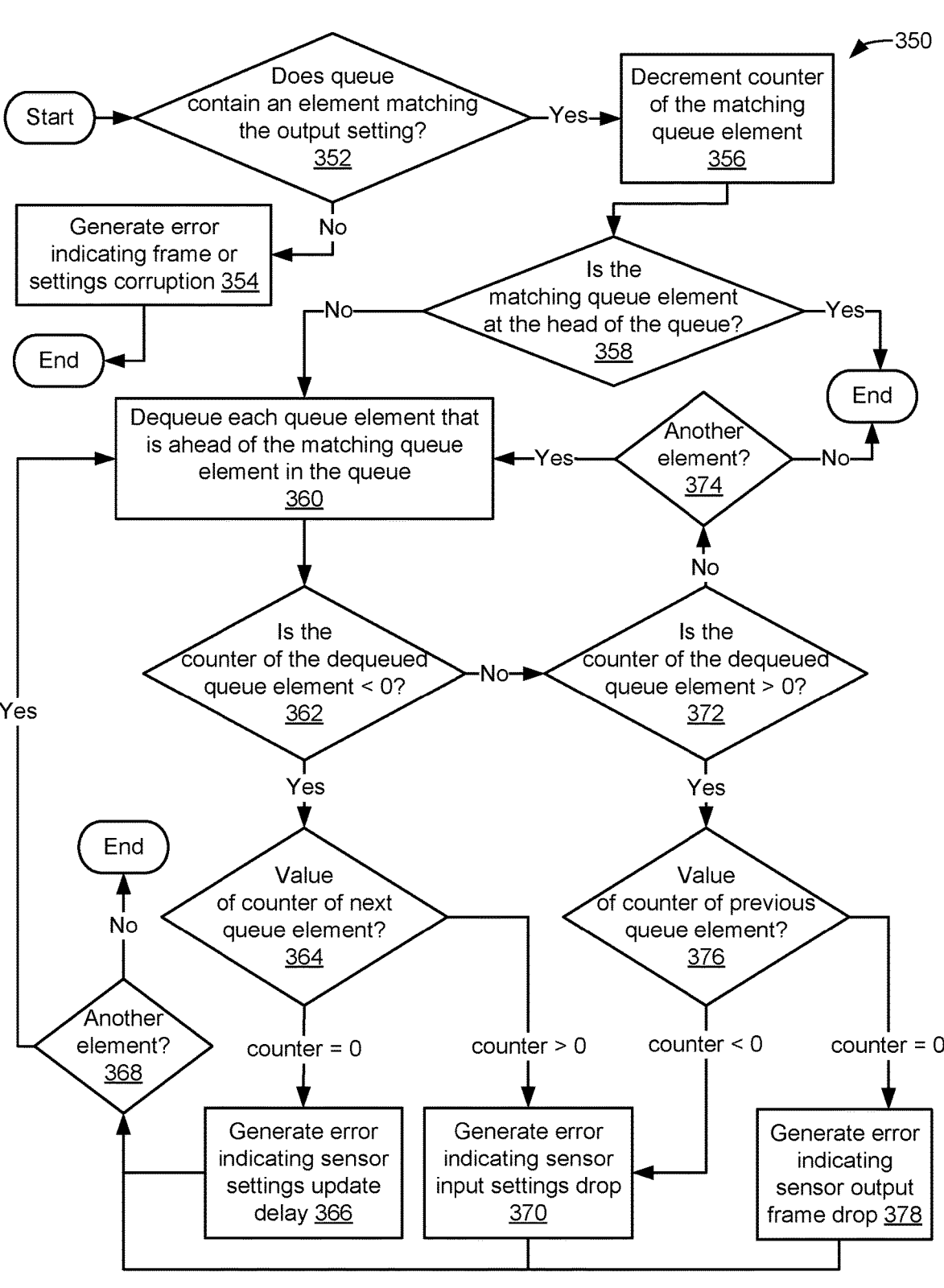
FIG. 3B illustrates a flow diagram of a method for processing settings frames containing sensor detection data in a runtime phase, according to various embodiments.

As shown in FIG. 3, method 300 begins with operation 302, in which a sensor failure detector 122 receives an output setting in a sensor output frame. In operation 304, the sensor failure detector 122 determines whether a current phase of execution of the sensor failure detector 122 is an initial phase of execution in which each sensor output frame 216 contains an output setting 222 having an initial setting value (also referred to herein as "Si"). Each output setting 222 during the initialization phase can have the same initial setting value. If the sensor failure detector 122 is not in the initial phase, then in operation 306 the sensor failure detector 122 performs operations of a runtime phase by executing the flowchart 350 of FIG. 3B, and the method 300 ends. If the sensor failure detector 122 is in the initial phase, then the sensor failure detector 122 performs operation 308. In operation 308, the sensor failure detector 122 determines whether a current frame number ("f") is less than or equal to an expected number of initial sensor output frames. The current frame number corresponds to the sensor output frame received in operation 302, and can be 1 for the first frame received, 2 for the second frame received, and so on. Each initial sensor output frame is a sensor output frame 216 for which the output setting 222 is a predetermined initial output setting instead of an output setting 222 determined from input settings 260. The initial output setting can be a set of predetermined settings values, e.g., a predetermined exposure and a predetermined gain. The initial output setting is referred to herein as "Sinitial". If in operation 308 the sensor failure detector 122 determines that the current frame number f is less than or equal to the expected number M of initial frames, then the method 300 ends. The method 300 is subsequently invoked again if another output setting is received in a sensor output frame.

If in operation 308 the sensor failure detector 122 determines that the current frame number f is not less than or equal to the number M of initial frames, then in operation 310 the sensor failure detector 122 determines whether the current frame number f is equal to the number of initial frames plus 1 ("M+1"). If so, then the sensor failure detector 122 performs operation 312.

In operation 312, the sensor failure detector 122 determines whether the output setting 222 of the current sensor output frame 216 is the initial setting Sinitial. If so, then the sensor failure detector 122 performs operation 318. In operation 318, the sensor failure detector 122 decrements a counter associated with a queue element having the initial setting (e.g., a queue element equal to the initial setting, or a queue element that contains the initial setting). The queue element having the initial setting can be, e.g., the first (oldest) element found in the sensor settings queue 124 having the setting Sinitial. If in operation 312 the sensor failure detector 122 determines that the current sensor output frame 216 does not have the initial setting, then in operation 316 the sensor failure detector 122 reports an error.

If in operation 310, the sensor failure detector 122 determines that the current frame number is not equal to the number of initial frames M plus 1, then the sensor failure detector 122 performs operation 314. In operation 314, the sensor failure detector 122 determines whether the counter of the queue element having the initial setting (Sinitial) is greater than or equal to 0. If not, then in operation 316 the sensor failure detector 122 reports an error.

If in operation 314 the sensor failure detector 122 determines that the counter of the next queue element having the initial setting is greater than or equal to 0, then in operation 320 the sensor failure detector 122 determines whether the current frame from the sensor 212 has the initial setting. If so, the sensor failure detector 122 performs operation 318, which decrements the counter of the queue element having the initial setting (Sinitial). Otherwise, the operation 320 determines that the current frame does not have the initial setting, and the current frame instead has a runtime-determined output setting 222. The output setting 222 is determined by the sensor 212 based on an input setting 260. In operation 322, the sensor failure detector 122 removes each queue element having an initial setting from the sensor settings queue 124. In operation 324, the sensor failure detector 122 sets the current phase of execution of the sensor failure detector 122 to a runtime phase of execution to indicate that the frames having initial settings have been consumed, and frames having runtime-determined output setting 222 can now be processed. In operation 326, the sensor failure detector 122 performs the runtime phase by executing the flowchart 350 of FIG. 3B.

FIG. 3B illustrates a flow diagram of a method 350 for processing settings frames containing sensor detection data in a runtime phase, according to various embodiments. Each block of method 350, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 350 is described, by way of example, with respect to the system of FIGS. 1-2. However, this method may additionally or alternatively be executed by any one system, or any combination of systems, including, but not limited to, those described herein. Further, the operations in method 350 can be omitted, repeated, and/or performed in any order without departing from the scope of the present disclosure.

As shown in FIG. 3B, method 350 begins with operation 352, in which the sensor failure detector 122 determines whether the sensor settings queue 124 contains an element matching the output setting received in operation 302 of the method 300 of FIG. 3A. Alternatively, in operation 352, the sensor failure detector 122 can determine whether the sensor settings queue 124 contains an element matching an output setting received in a sensor output frame from any suitable source. If in operation 350 the sensor failure detector 122 determines that the sensor settings queue 124 does not contain an element matching the output setting, then in operation 354 the sensor failure detector 122 generates an error indicating frame or settings corruption. Otherwise, the sensor settings queue 124 contains an element matching the output setting, and the sensor failure detector 122 performs operation 356.

In operation 356, the sensor failure detector 122 decrements a counter of the matching queue element, e.g., by subtracting 1 from the counter. In operation 358, the sensor failure detector 122 determines whether the matching queue element is at the head of the sensor settings queue 124. If so, the method 350 ends. Otherwise, the matching queue element is not at the head of the sensor settings queue 124, and the sensor failure detector 122 performs operation 360. In operation 360, the sensor failure detector 122 dequeues each queue element that is ahead of the matching queue element in the queue (e.g., that was added to the queue prior to the matching element being added). The sensor failure detector 122 performs operation 362 for each dequeued queue element that is dequeued in operation 360.

In operation 362, the sensor failure detector 122 determines whether the counter associated with the dequeued queue element is less than 0. If so, then in operation 364 the sensor failure detector 122 determines whether the value of the next queue element (e.g., the next element in the sensor settings queue 124) is 0, in which case the sensor failure detector 122 performs operation 366, or greater than 0, in which case the sensor failure detector 122 performs operation 370. In operation 366, the sensor failure detector 122 generates an error indicating that a sensor settings update delay occurred. In operation 370, the sensor failure detector 122 generates an error indicating that a sensor settings drop occurred.

If in operation 362 the sensor failure detector 122 determines that the counter associated with the dequeued queue element is less than 0, then the sensor failure detector 122 performs operation 372. In operation 372, the sensor failure detector 122 determines whether the counter associated with the dequeued queue element is greater than 0. If so, the sensor failure detector 122 performs operation 376. In operation 376 the sensor failure detector 122 determines whether the value of the counter associated with the previous queue element (e.g., the previous element in the sensor settings queue 124) is less than 0, in which case the /12 performs operation 370, or is equal to 0, in which case the sensor failure detector 122 performs operation 378. In operation 378, the sensor failure detector 122 generates an error indicating that a sensor output frame drop occurred. The error(s) generated in operations 366, 370, and/or 370 can be, for example, error data 246 containing a failure mode indicator 242 that indicates the type of error. Subsequent to operation 366, 370, or 376, the sensor failure detector 122 performs operation 368, which determines whether there is another queue element ahead of the matching queue element in the sensor settings queue 124. If so, the sensor failure detector 122 performs operation 360 and subsequent operations again. If not, the method 350 ends. Further, if in operation 372 the sensor failure detector 122 determines that there is another queue element ahead of the matching queue element in the sensor settings queue 124, then the sensor failure detector 122 performs operation 360 and subsequent operations again.

Figure 4:
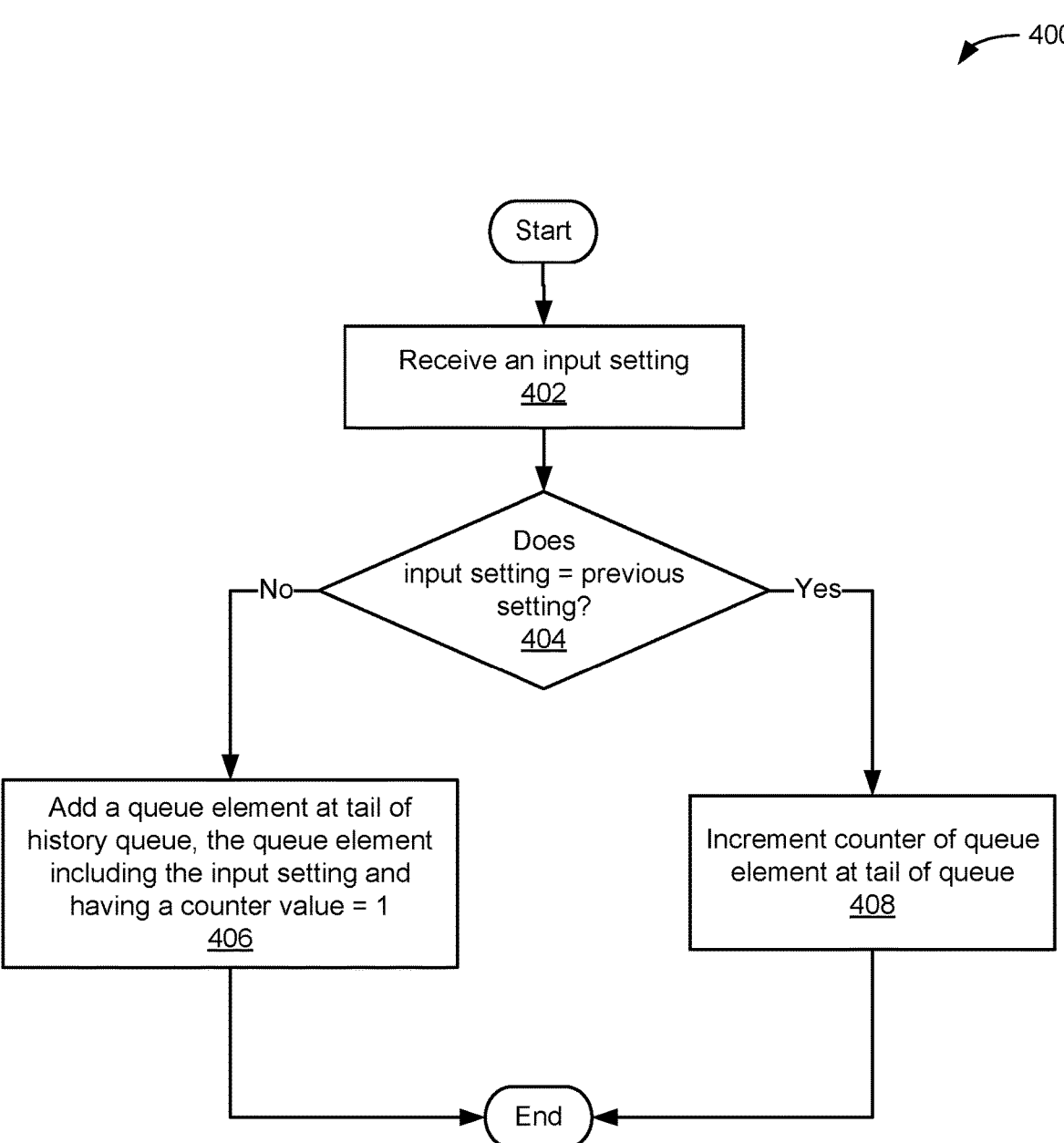
FIG. 4 illustrates a flow diagram of a method for enqueueing sensor settings in a settings history queue, according to various embodiments.

FIG. 4 illustrates a flow diagram of a method 400 for enqueueing sensor settings in a settings history queue, according to various embodiments. Each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the system of FIGS. 1-2. However, this method may additionally or alternatively be executed by any one system, or any combination of systems, including, but not limited to, those described herein. Further, the operations in method 400 can be omitted, repeated, and/or performed in any order without departing from the scope of the present disclosure.

As shown in FIG. 4, method 400 begins with operation 402, in which the /12 receives an input setting 260, e.g., from a sensor settings generator 204. In operation 404, the sensor failure detector 122 determines whether the input setting matches (e.g., is equal to) the previous input setting in the sensor failure detector 122. The previous input setting can be the setting most recently added prior to receiving the input setting in operation 402. If operation 404 determines that the input setting matches the previous input setting, then the sensor failure detector 122 performs operation 406. In operation 406, the sensor failure detector 122 adds (e.g., enqueues) a queue element at the tail of the sensor settings queue 124. The added queue element includes the input setting and is associated with the counter value 1. If operation 404 determines that the input setting does not match the previous setting, then in operation 408 the sensor failure detector 122 increments the counter of the queue element at the tail of the sensor settings queue 124.

FIGS. 5A and 5B illustrate an example execution 500 of an initial phase of a sensor failure detector in failure-free operation of sensor system, in accordance with some embodiments of the present disclosure. In the example failure-free execution 500, an input settings sequence 502 generated by a sensor settings generator 204 is provided to a sensor failure detector 122. The input settings sequence 502 is also provided to a sensor 212, e.g., by the sensor failure detector 122 or by the sensor failure detector 122. Each element of the input settings sequence 502 corresponds to an input setting 260. The input settings sequence 502 includes the elements Si, Si, Si, Si, Si, S1 S2, S2, S3, each of which represents an input setting 260. Si (also referred to herein as Sinitial) represents a predetermined initial setting that is generated by the sensor settings generator 204 during an initial phase, and S1, S2, S3 represent three different settings. The initial setting Si is sent to the sensor failure detector 122 (and also to the sensor 212) M=5 times in this example. The initial settings can be sent to prepare the sensor for operation, for example. The sensor failure detector 122 receives and processes each element (e.g., each input setting 260) of the input settings sequence 502 during a respective period of time that corresponds to a frame, and updates the sensor settings queue 124 accordingly, as shown in FIGS. 5A and 5B. As described with respect to FIG. 3A, the first M (e.g., 5) output frames received from the sensor 212 are expected to have the initial setting Si, and can be discarded.

The sensor 212 generates an output settings sequence 504 in response to receiving the input settings sequence 502. Each element of the output settings sequence 504 corresponds to an output setting 222 of a sensor output frame 216. The output settings sequence 502 includes the elements Sr, Sr, Si, Si, Si, Si, S1, S2, S2, S3. The setting Sr corresponds to random or unknown data generated by the sensor settings generator 204 prior to initialization. The output settings sequence 502 thus includes two occurrences of the random setting Sr, three occurrences of the initial setting Si, one occurrence of a setting S1, two occurrences of a setting S2, and one occurrence of a setting S3. The sensor failure detector 122 receives and processes each element (e.g., each output setting 222) of the output settings sequence 504 during a respective period of time that corresponds to a frame, and updates the sensor settings queue 124 accordingly, as shown in FIGS. 5A and 5B.

The input settings sequence 502 is processed by the input settings enqueuer 210. An example method for processing the input settings is shown in FIG. 4. The output settings sequence 504 is processed by the output setting analyzer 234. An example method for processing the output settings is shown in FIGS. 3A and 3B. The input settings sequence 502 can be processed in parallel with the output settings sequence 504.

At frame "1" 520-1, the sensor failure detector 122 receives the first of the five Si input settings. The sensor failure detector 122 enqueues the input setting in the sensor settings queue 522 if the input setting is different from the previous input setting. Since there is no previous setting at frame 1, the input setting Si is enqueued, resulting in a settings queue 522-1 that contains the setting Si. The sensor failure detector 122 also sets the count associated with the setting Si to 1 because the input setting is different from the previous setting (as described with reference to FIG. 4). Thus, the queue 522-1 contains a single element Si having count=1. The count can be stored in the queue 522-1 (e.g., in the same queue element as the setting Si), or separately from the queue. Further, at frame 1 520-1, the sensor failure detector 122 receives the first of the two Sr output settings from the sensor 212. Since the frame number, which is 1, is less than or equal to the number of expected initial frames M=5, the sensor failure detector 122 performs no further action for frame 520-1.

At frame "2" 520-2, the sensor failure detector 122 receives the second of the five Si input settings. Since Si is equal to the previous setting (the first Si, from frame 1), the sensor failure detector 122 increments the count of the previously-enqueued Si (which is at the tail of the queue). As a result, the settings queue 522-2 contains the setting Si with associated count=2. Further, at frame 2 520-2, the sensor failure detector 122 receives the second of the two Sr output settings. Since the frame number, which is 2, is less than or equal to the number of expected initial frames M=5, the sensor failure detector 122 performs no further action for frame 2.

At frame "3" 520-3, the sensor failure detector 122 receives the third of the five Si input settings. Since Si is equal to the previous setting (the second Si, from frame 2), the sensor failure detector 122 increments the count of the previously-enqueued Si. As a result, the settings queue 522-3 contains the setting Si with associated count=3. Further, at frame 3 520-3, the sensor failure detector 122 receives the first of the five Si output settings. Since the frame number, which is 3, is less than or equal to the number of expected initial frames M=5, the sensor failure detector 122 performs no further action for frame 3.

At frame "4" 520-4, the sensor failure detector 122 receives the fourth of the 5 Si input settings. Since Si is equal to the previous setting (the third Si, from frame 3), the sensor failure detector 122 increments the count of the previously-enqueued Si. As a result, the settings queue 522-4 contains the setting Si with associated count=4. Further, at frame 4 520-4, the sensor failure detector 122 receives the second of the five Si output settings. Since the frame number, which is 4, is less than or equal to the number of expected initial frames M=5, the sensor failure detector 122 performs no further action for frame 4.

At frame "5" 520-5, the sensor failure detector 122 receives the fifth of the five Si input settings. Since Si is equal to the previous setting (the fourth Si, from frame 4), the sensor failure detector 122 increments the count of the previously-enqueued Si. As a result, the settings queue 522-5 contains the setting Si with associated count=5. Further, at frame 5 520-5, the sensor failure detector 122 receives the third of the five Si output settings. Since the frame number, which is 5, is less than or equal to the number of expected initial frames M=5, the sensor failure detector 122 performs no further action for frame 5.

At frame "6" 520-6, the sensor failure detector 122 receives the S1 input setting. Since S1 is not equal to the previous setting (the fifth Si, from frame 5), the sensor failure detector 122 adds the input setting S1 to the settings queue 522-6 with count=1. As a result, the settings queue 522-6 contains the setting Si with associated count=5 as the first element (at the head of the queue) and the setting S1 with associated count=1 as the second element (at the tail of the queue). Further, at frame 6 520-6, the sensor failure detector 122 receives the fourth of the five Si output settings. Since the frame number, which is 6, is equal to the number of expected initial frames M=5 plus 1 (see operation 310 of FIG. 3A) and the current output frame setting is Si (see operation 312), the sensor failure detector 122 performs the action of decrementing the counter of the queue element having setting=Si (see operation 318). Subsequent to performing the action, the settings queue 524-6 contains the setting Si with count=4 at the head of the queue. Since the current received output frame setting is Si (see operation 312), no error occurs at frame 6 (Status: OK).

At frame "7" 520-7, the sensor failure detector 122 receives the first of the two S2 input settings. Since S2 is not equal to the previous setting (S1), the sensor failure detector 122 adds the input setting S2 to the settings queue 522-7 with count=1. As a result, the settings queue 522-7 contains the setting Si with count=4 as the first element (at the head of the queue), the setting S1 with count=1 as the second element, and the setting S2 with count=1 as the third element (at the tail of the queue). Further, at frame 7 520-7, the sensor failure detector 122 receives the fifth of the five Si output settings. Since the frame number, which is 7, is greater than or equal to the number of expected initial frames M=5 plus 2 (in operation 310 of FIG. 3A), the counter of the queue element having setting Si is greater than or equal to 0 (see operation 314), and the current input frame setting is Si (see operation 320), the sensor failure detector 122 performs the action of removing each queue element having setting=Si from the queue (see operation 320). Subsequent to performing the action, the settings queue 524-7 contains the setting Si with associated count=3 at the head of the queue. Since the current received output frame setting is Si (see operation 312), no error occurs at frame 6 (Status: OK).

At frame "8" 520-8, the sensor failure detector 122 receives the second of the two S2 input settings. Since S2 is equal to the previous setting (S2), the sensor failure detector 122 increments the count associated with S2 in settings queue 522-8. As a result, the settings queue 522-8 contains the setting Si with count=3 as the first element (at the head of the queue), the setting S1 with count=1 as the second element, and the setting S2 with count=2 as the third element (at the tail of the queue). Further, at frame 8 520-8, the sensor failure detector 122 receives the S1 output setting. Since the frame number, which is 8, is greater than or equal to the number of expected initial frames M=5 plus 2 (in operation 310 of FIG. 3A), the counter of the queue element having setting Si is greater than or equal to 0 (see operation 314), and the current input frame setting (S1) is not equal to Si (see operation 320), the sensor failure detector 122 performs the action of removing the queue element having setting=Si from the queue (see operation 322) and decrementing the counter associated with the current input frame setting (S1). The sensor failure detector 122 also sets the current phase indicator to "runtime" (operation 324) so that subsequent input settings and output settings are processed by the runtime phase method of FIG. 3B. Subsequent to performing the action, the settings queue 524-8 contains the setting S1 with count=0 at the head of the queue and further contains the setting S2 with count=2 at the tail of the queue. No error occurs at frame 6 (Status: OK).

At frame "9" 520-9, the sensor failure detector 122 receives the S3 input setting. Since S3 is not equal to the previous setting (S2), the sensor failure detector 122 adds S3 to the settings queue 522-9. As a result, the settings queue 522-9 contains the setting S1 with count=0 as the first element (at the head of the queue), and the setting S2 with count=2 as the second element, and the setting S3 with count=1 as the third element. Further, at frame 9 520-9, the sensor failure detector 122 performs the runtime phase method 350 of FIG. 3B instead of the initial phase method 300 of FIG. 3A because the current phase indicator was set to "runtime" in frame 8. Accordingly, the sensor failure detector 122 receives the output setting S2 and determines whether the settings queue 522-9 contains an element having a setting matching the received output setting S2 (see operation 352). Since the settings queue 522-9 contains S2, the sensor failure detector 122 decrements the counter of S2 (see operation 356). The sensor failure detector 122 determines whether the matching queue element (S2) is at the head of the queue (see operation 358). Since S2 is not at the head of the queue, the sensor failure detector 122 dequeues each element that is ahead of the matching queue element (see operation 360). The sensor failure detector 122 compares the counter of the dequeued element S2 to 0 (see operations 362 and 372). Since the counter is zero, no errors are generated for frame 9 (Status: OK). Subsequent to performing the action, the settings queue 524-8 contains the setting S2 with count=1 at the head of the queue and further contains the setting S3 with count=1 at the tail of the queue.

FIG. 5C illustrates an example execution 501 of an initial phase of a sensor failure detector when sensor settings corruption occurs, in accordance with some embodiments of the present disclosure. In the example execution 501, an input settings sequence 506 is provided to a sensor failure detector 122 and to a sensor 212. The input settings sequence 506 is the same as the input sequence 502 of FIG. 5A and includes the elements Si, Si, Si, Si, Si, S1 S2, S2, S3. The output settings sequence 508 includes the elements Sr, Sr, Si, Si, Si, S100, S1, S2, S2, S3. Frames "1" 530-1 through "5" 530-5 are the same as frames "1" 520-1 through "5" 520-5 of FIGS. 5A and 5B. At frame "6" 530-6, the sensor failure detector 122 receives the input setting S1. The sensor failure detector 122 enqueues the input setting S1 in the sensor settings queue 532-6 because S1 is different from the previous input setting (Si). The sensor failure detector 122 also sets the count associated with the setting S1 to 1. Thus, the queue 532-6 contains an element Si having count=5 (at the head of the queue) and an element S1 having count=1. Further, at frame 6 530-6, the sensor failure detector 122 receives the S100 output setting from the sensor 212. The sensor failure detector 122 searches the settings queue 532-6 for the received setting S100 (see operation 352 of FIG. 3B). Since the settings queue 532-6 does not contain the setting S100, the sensor failure detector 122 generates a settings corruption error (see operation 354).

FIG. 6A illustrates an example execution 600 of a runtime phase of a sensor failure detector when sensor settings corruption occurs, in accordance with some embodiments of the present disclosure. In the example execution 600, the input settings sequence 602 includes the elements S-1, S0, S1, S2, S3, S4 (where S-1 represents S-1). The output settings sequence 604 includes the elements S-1, S0, S100, S2, S3, S4.

At frame N 620-1, the sensor failure detector 122 receives the S1 input setting. Since S1 is not equal to the previous setting, the sensor failure detector 122 adds the input setting S1 to the settings queue 622-1 with count=1. As a result, the settings queue 522-6 contains the setting S-1 having count=1 (at the head of the queue), the setting S0 having count=1, and the setting S1 having count=1. Further, at frame N 620-1, the sensor failure detector 122 receives the output setting S-1. The sensor failure detector 122 is executing in the runtime phase. The sensor failure detector 122 finds a queue element matching the output setting S-1 (see operation 352) and decrements the counter of the matching queue element (see operation 356). Since the matching queue element is at the head of the queue, no dequeuing is performed, and no error occurs at frame N (Status: OK). Subsequent to performing the action, the settings queue 624-1 contains the setting S-1 with count=0 at the head of the queue, the setting S0 with count=1 in the second queue element, and the setting S1 with count=1 in the third queue element.

At frame N+1 620-2, the sensor failure detector 122 receives the S2 input setting. Since S2 is not equal to the previous setting, the sensor failure detector 122 adds the input setting S2 to the settings queue 622-2 with count=1. As a result, the settings queue 622-2 contains the setting S-1 having count=0 (at the head of the queue), the setting S0 having count=1, the setting S1 having count=1, and the setting S2 having count=1. Further, at frame N+1 620-2, the sensor failure detector 122 receives the output setting S0. The sensor failure detector 122 is executing in the runtime phase. The sensor failure detector 122 finds a queue element matching the output setting S0 (see operation 352) and decrements the counter of the matching queue element (see operation 356). Since the matching queue element is not at the head of the queue, each element that is ahead of the matching element S0 is dequeued (see operation 360), and the counter of each dequeued queue element is compared to 0. Since the setting S-1 is ahead of S0 in the queue, the setting S-1 Since the counter of the dequeued queue element S-1 is 0, no error occurs at frame N (Status: OK). Subsequent to performing the action, the settings queue 624-2 contains the setting S0 with count=1 in the head element, the setting S1 with count=1 in the second element, and the setting S2 with count 1 in the third element. Since the matching queue element S0 is at the head of the queue, no dequeuing is performed, and no error occurs at frame N (Status: OK).

At frame N+2 620-3, the sensor failure detector 122 receives the S3 input setting. Since S3 is not equal to the previous setting, the sensor failure detector 122 adds the input setting S3 to the settings queue 622-3 with count=1. As a result, the settings queue 622-3 contains the setting S0 having count=1 (at the head of the queue), the setting S1 having count=1, the setting S2 having count=1, and the setting S3 having count=1. Further, at frame N+2 620-3, the sensor failure detector 122 receives the output setting S100. The sensor failure detector 122 searches the queue 622-3 for a queue element matching the output setting S100, but the setting S100 is not found because it is not present in the queue. Since the matching queue element is not found, the sensor failure detector 122 generates a settings corrupted error (see operation 354).

FIG. 6B illustrates an example execution 605 of a runtime phase of a sensor failure detector when a sensor settings delay occurs, in accordance with some embodiments of the present disclosure. In the example execution 605, the input settings sequence 606 includes the elements S-1, S0, S1, S2, S3, S4, S5 (where S-1 represents S-1). The output settings sequence 608 includes the elements S-1, S0, S1, S1, S2, S3. The setting S2 has been delayed, so S1 appears twice in the received settings sequence 608. Frames N 630-1 and N+1 630-2 of FIG. 6B are the same as frames N 620-1 and N+1 620-2 of FIG. 6A.

At frame N+2 630-3, the sensor failure detector 122 receives the S3 input setting. Since S3 is not equal to the previous setting (S2), the sensor failure detector 122 adds the input setting S3 to the settings queue 632-3 with count=1. As a result, the settings queue 632-3 contains the setting S0 having count=0 (at the head of the queue) followed by the settings S1, S2, and S3, each having count=1. Further, at frame N+2 630-3, the sensor failure detector 122 receives the first of the two Si output settings. The sensor failure detector 122 finds a queue element matching the output setting S1 and decrements the counter of the matching queue element Si. Since the matching queue element is not at the head of the queue, the sensor failure detector 122 dequeues each element (S0) that is ahead of the matching queue element. The sensor failure detector 122 compares the counter of the dequeued element S0 to 0. Since the counter is zero, no errors are generated for frame N+1 630-3 (Status: OK).

At frame N+3 630-4, the sensor failure detector 122 receives the S4 input setting. Since S4 is not equal to the previous setting (S3), the sensor failure detector 122 adds the input setting S4 to the settings queue 632-4 with count=1. Further, at frame N+3 630-3, the sensor failure detector 122 receives the second S1 output setting. The sensor failure detector 122 finds a queue element matching the output setting S1 and decrements the counter of the matching queue element S1. As a result of the decrementing, the count associated with S1 becomes −1. Since the matching queue element is at the head of the queue, the sensor failure detector 122 does not dequeue any elements at frame N+3 630-4, and no errors are generated at frame N+3 630-4.

At frame N+4 630-5, the sensor failure detector 122 receives the S5 input setting. Since S5 is not equal to the previous setting (S4), the sensor failure detector 122 adds the input setting S5 to the settings queue 632-5 with count=1. Further, at frame N+4 630-3, the sensor failure detector 122 receives the second S2 output setting. The sensor failure detector 122 finds a queue element matching the output setting S2 and decrements the counter of the matching queue element S2. As a result of the decrementing, the count associated with S2 becomes 0. Since the matching queue element S2 is not at the head of the queue, the sensor failure detector 122 dequeues each element (S1) that is ahead of the matching queue element S2. The sensor failure detector 122 compares the counter of the dequeued element S1 to 0. Since the counter of S1 is less than 0, and the counter of the next queue element S2 is 0, the sensor failure detector 122 determines that a settings update delay has occurred (see operation 366 of FIG. 3B).

FIG. 6C illustrates an example execution 607 of a runtime phase of a sensor failure detector when a sensor output frame drop occurs, in accordance with some embodiments of the present disclosure. In the example execution 607, the input settings sequence 610 includes the elements S-1, S0, S1, S1, S2, S3, S4 (where S-1 represents S-1). The output settings sequence 612 includes the elements S-1, S0, S1, S2, S3, S4. The second S1 is not present in the output settings sequence 612, so an output setting drop error has occurred. Frame N 640-1 of FIG. 6B is the same as frame N 630-1 of FIG. 6B.

At frame N+1 640-2, the sensor failure detector 122 receives the S1 input setting. Since S1 is equal to the previous setting (S1), the sensor failure detector 122 increments the count of S1 in the settings queue 642-2, resulting in a count=2. Further, at frame N+1 630-2, the sensor failure detector 122 receives the S0 output setting. The sensor failure detector 122 finds a queue element matching the output setting S0 and decrements the counter of the matching queue element S0. As a result of the decrementing, the count associated with S0 becomes 0. Since the matching queue element is not at the head of the queue, the sensor failure detector 122 dequeues each element (S-1) that is ahead of the matching queue element (S0). The sensor failure detector 122 compares the counter of the dequeued element S-1 to 0. Since the counter is zero, no errors are generated for frame N+1 640-2 (Status: OK).

At frame N+2 640-3, the sensor failure detector 122 receives the S2 input setting. Since S2 is not equal to the previous setting (S1), the sensor failure detector 122 adds the input setting S2 to the settings queue 642-3 with count=1. As a result, the settings queue 642-3 contains the setting S0 having count=0 (at the head of the queue) followed by the settings S1 having count=2 and S2 having count=1. Further, at frame N+2 640-3, the sensor failure detector 122 receives the S1 output setting. The sensor failure detector 122 finds a queue element matching the output setting S1 and decrements the counter of the matching queue element 51. Since the matching queue element is not at the head of the queue, the sensor failure detector 122 dequeues each element (S0) that is ahead of the matching queue element. The sensor failure detector 122 compares the counter of the dequeued element S0 to 0. Since the counter is zero, no errors are generated for frame N+2 640-3 (Status: OK).

At frame N+3 640-4, the sensor failure detector 122 receives the S3 input setting. Since S3 is not equal to the previous setting (S2), the sensor failure detector 122 adds the input setting S3 to the settings queue 642-4 with count=1. Further, at frame N+3 640-4, the sensor failure detector 122 receives the S2 output setting. The sensor failure detector 122 finds a queue element matching the output setting S2 and decrements the counter of the matching queue element S2. As a result of the decrementing, the counter associated with S2 becomes 0.

Since the matching queue element is not at the head of the queue, the sensor failure detector 122 dequeues each element (S1) that is ahead of the matching queue element (S2). The sensor failure detector 122 compares the counter of the dequeued element S1 to 0. Since the counter is 1, which is greater than 0, and the counter of the previous dequeued element (0 of element S2), an output frame drop error is generated for frame N+3 (see operation 378 of FIG. 3B).

Figure 6D:
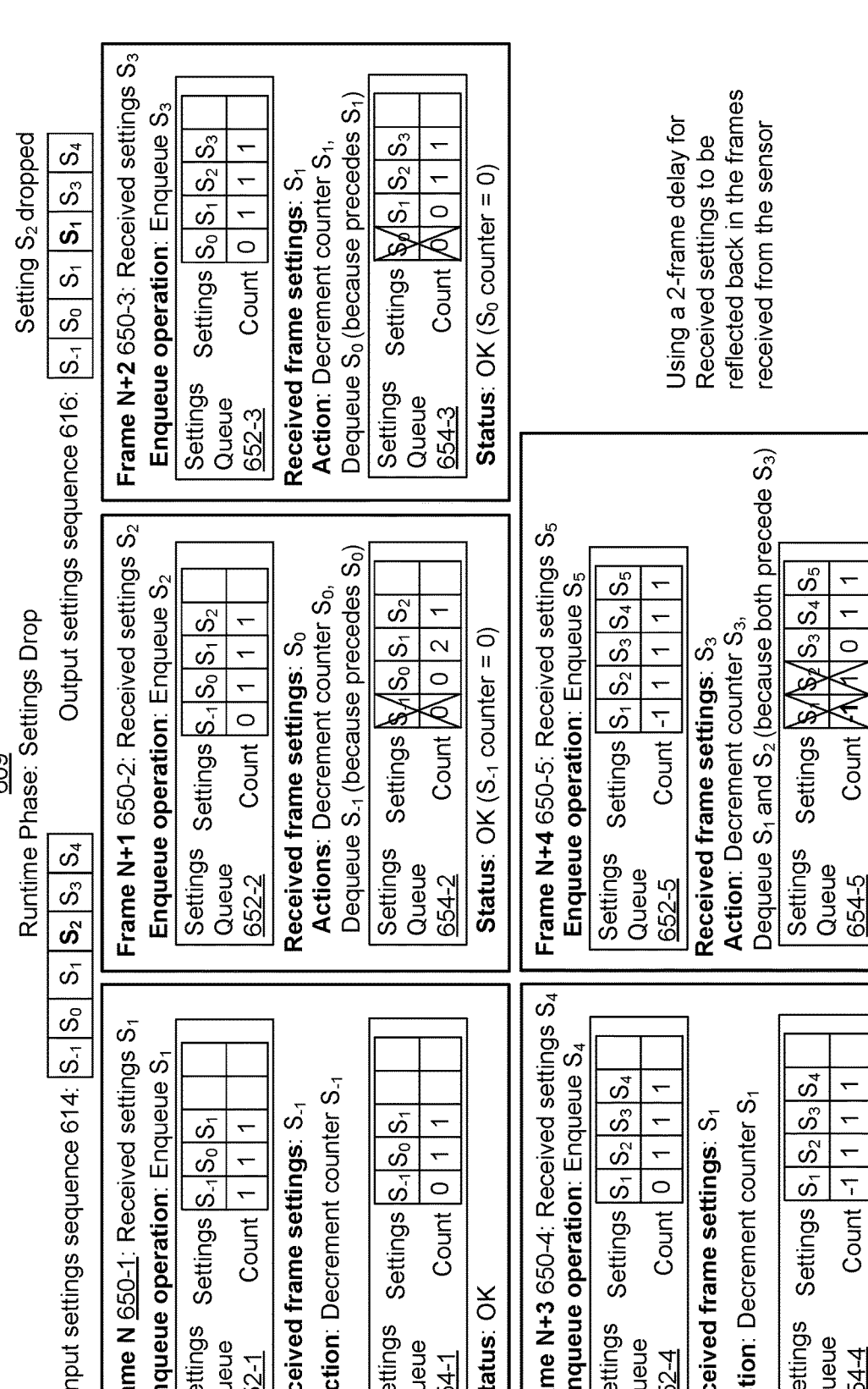
FIG. 6D illustrates an example execution of a runtime phase of a sensor failure detector when a sensor settings drop occurs, in accordance with some embodiments of the present disclosure.

FIG. 6D illustrates an example execution 609 of a runtime phase of a sensor failure detector when a sensor settings drop occurs, in accordance with some embodiments of the present disclosure. In the example execution 609, the input settings sequence 614 includes the elements S-1, S0, S1, S2, S3, S4 (where S-1 represents S-1). The output settings sequence 616 includes the elements S-1, S0, Si, Si, S2, S3. The input setting S2 has been dropped, so S1 appears twice in the received settings sequence 616. Frames N 650-1 through N+3 650-4 of FIG. 6D are the same as frames N 630-1 through N+3 630-4 of FIG. 6B.

At frame N+4 650-5, the sensor failure detector 122 receives the S5 input setting. Since S5 is not equal to the previous setting (S4), the sensor failure detector 122 adds the input setting S5 to the settings queue 652-5 with count=1. As a result, the settings queue 652-5 contains the setting S1 having count=−1 (at the head of the queue) followed by the settings S2, S3, S4, and S5, each having count=1. Further, at frame N+4 650-5, the sensor failure detector 122 receives the S3 output setting. The sensor failure detector 122 finds a queue element matching the output setting S3 and decrements the counter of the matching queue element S3. Since the matching queue element S3 is not at the head of the queue, the sensor failure detector 122 dequeues each element (S1 and S2) that is ahead of the matching queue element. The sensor failure detector 122 compares the counter of the dequeued element S1 to 0. Since the counter of S1 is less than 0 and the counter of the next queue element S2 is greater than 0, an input settings drop error is generated for frame N+4 650-5 (see operation 370).

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

In sum, the disclosed techniques use a sensor settings verification system to detect and report failures that occur in sending or applying input sensor settings to sensors, or in receiving output sensor settings from sensors. The settings verification system monitors "input" settings sent to the sensor by a sensor controller or other system component. The settings verification system also monitors "output" settings, which are received with each output data frame generated by the sensor and indicate the settings used by the sensor to generate the output data frame. The settings verification system stores each input setting in a settings history queue when the setting is sent to the sensor, and associates a count value with each input setting in the queue. The count associated with each input setting in the queue is updated as input settings are sent to the sensor and output settings are received from the sensor, and represents a difference between the number of consecutive times the input setting has been sent to the sensor and a number of times an output setting that matches the input setting has been received.

The settings verification system uses the queue to detect a settings failure. Settings failures can include a failure to receive expected input settings at the sensor ("settings drop"), a failure to receive a sensor output data frame that contains an output setting matching a corresponding input setting ("frame drop"), a delay in updating the sensor to use input settings ("settings delay"), or corruption of input settings or output settings ("settings corruption"), for example. If a failure does not occur, then the count associated with a particular input setting in the queue becomes zero prior to receiving an output data frame containing a different output setting that matches a different input setting sent to the sensor subsequently to the particular input setting. A settings corruption failure can be detected when an output setting is received. If an input setting matching the output setting is not found in the queue, then a settings corruption failure has occurred. Other types of failures, such as settings drop, frame drop, or settings delay, can be detected when an output setting is received and the output setting matches an input setting that is in the queue but not at the head of the queue. In this case, there is at least one non-matched input setting ahead of the matching output setting in the queue. If the count associated with the non-matched input setting is nonzero, then a failure has occurred. The failure is identified based on whether the count associated with the matching output setting is less than zero (e.g., settings update delay or sensor settings drop) or greater than zero (e.g., frame drop or sensor settings drop). The particular failure can be identified based on a count associated with the next setting in the queue or the previous setting in the queue. If a failure is identified, the settings verification system generates an error to inform other system components, such as a sensor controller or an application, of the type of failure and the output settings and/or input settings associated with the failure.

One technical advantage of the disclosed techniques relative to the prior art is the ability to detect failure to apply sensor settings when numerous different settings are applied, as occurs when using continuous auto exposure, for example. Another technical advantage of the disclosed techniques is the ability to identify and report the failure mode. Failure modes that can be detected include data corruption, dropped settings that were sent but not used by the sensor, or dropped output frames that were not received from the sensor. The identified failure mode can be used to find the cause of the failure and take corrective action. These technical advantages represent one or more technological improvements over prior art approaches.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 7A:
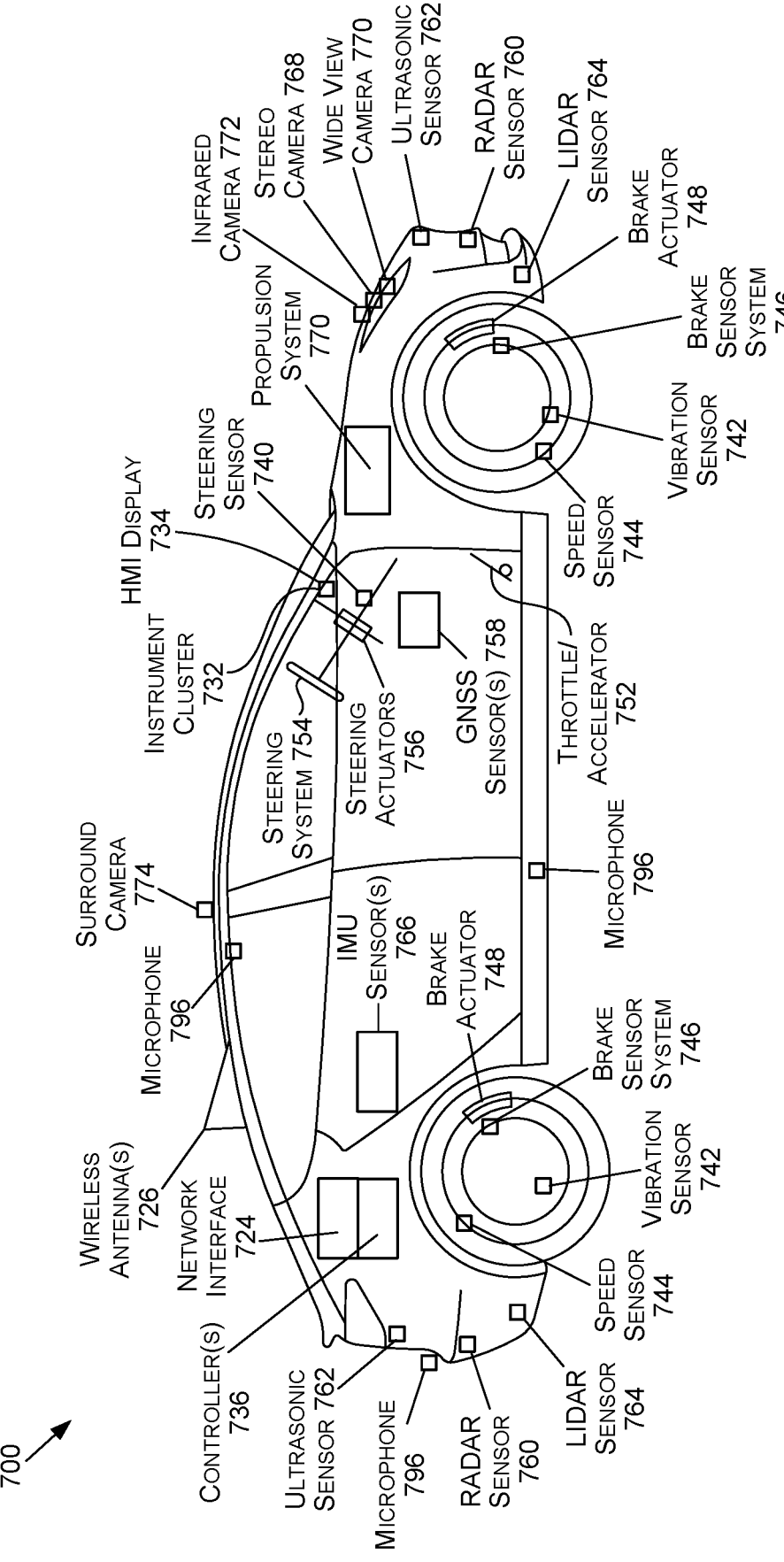
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 7 of the autonomous driving levels. The vehicle 700 may be capable of functionality in accordance with one or more of Level 1-Level 7 of the autonomous driving levels. For example, the vehicle 700 may be capable of driver assistance (Level 1), partial automation (Level 2), conditional automation (Level 3), high automation (Level 4), and/or full automation (Level 7), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 7) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LiDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s)

772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types. The controller(s) 736 may include one or more instances of sensor failure detector 122 to monitor sensor performance based on the corresponding sensor data.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
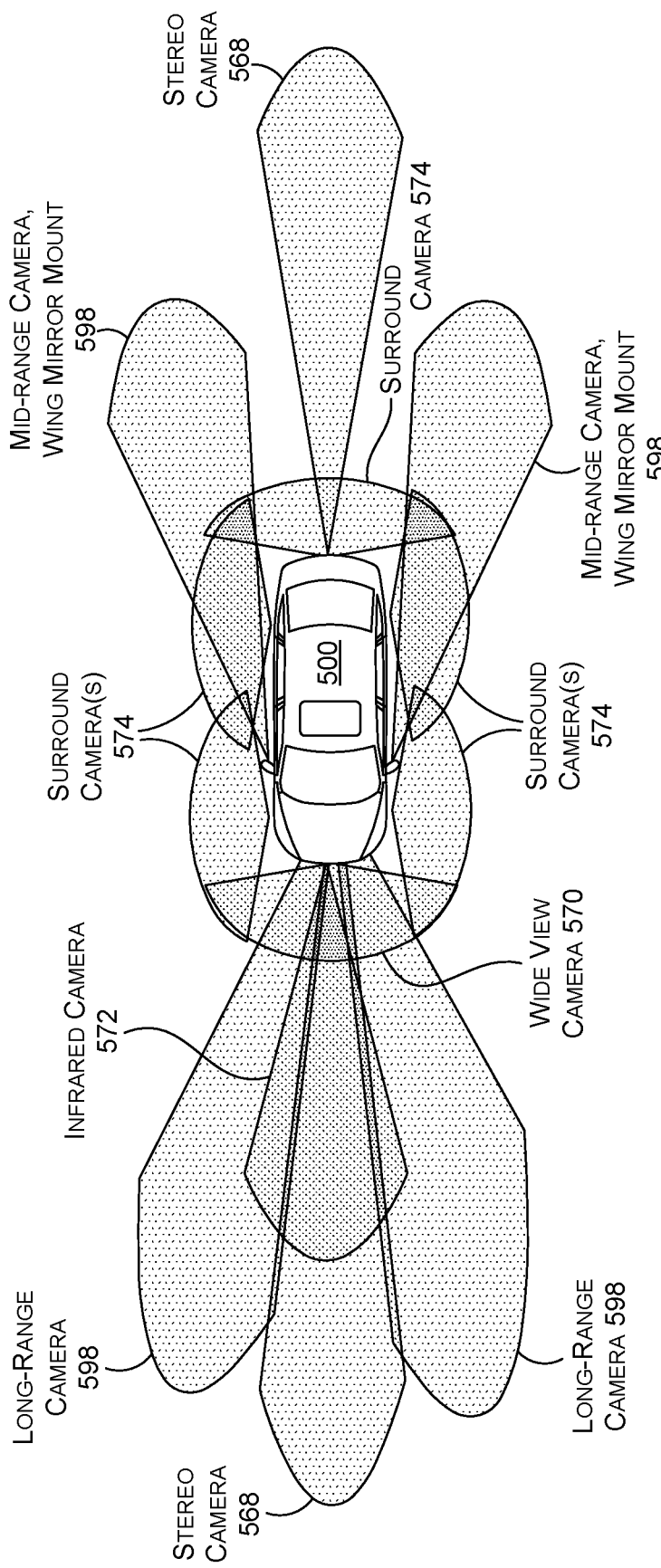
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
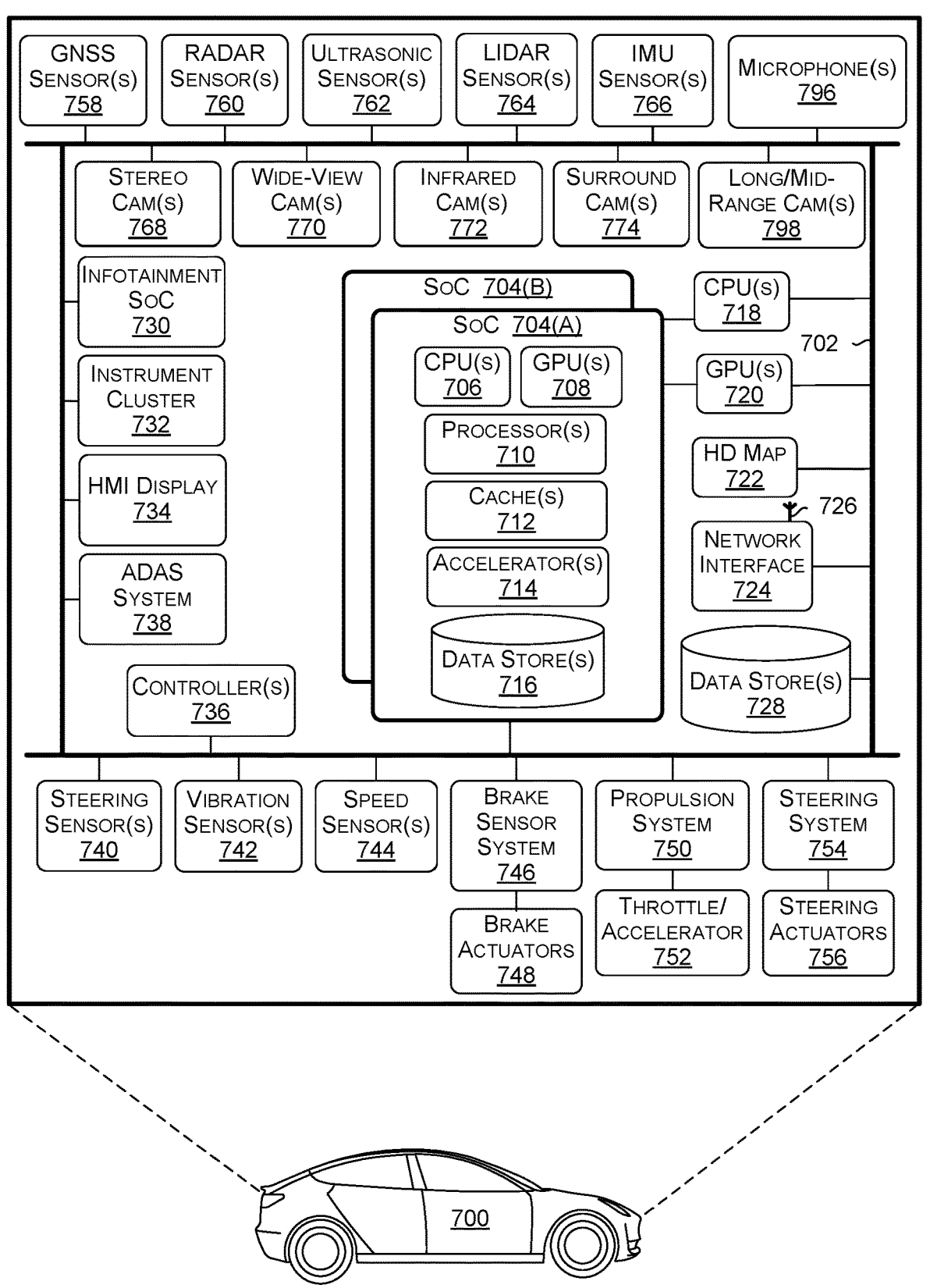
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A may bus may be configured to have dozens or even hundreds of nodes, each with its own unique identifier (e.g., a may ID). The may bus may be read to find steering wheel angle, ground speed, engine revolutions per minute (RPMs), button positions, and/or other vehicle status indicators. The may bus may be ASIL B compliant.

Although the bus 702 is described herein as being a may bus, this is not intended to be limiting. For example, in addition to, or alternatively from, the may bus, FlexRay and/or Ethernet may be used. Additionally, although a single line is used to represent the bus 702, this is not intended to be limiting. For example, there may be any number of busses 702, which may include one or more may busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the may bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 712 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s)

712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))— or other math coprocessor or numeric coprocessor types— for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LiDAR sensor (s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LiDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or may bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex. The DLA may further utilize metrics associated with sensor performance as input into one or more neural networks.

As another example, multiple neural networks may be run simultaneously, as is required for Level 3, 4, or 7 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the may and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed may and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LiDAR sensor(s) 764. The LiDAR sensor(s) 764 may be used for object and pedestrian detection, emergency braking, collision avoidance, and/or other functions. The LiDAR sensor(s) 764 may be functional safety level ASIL B. In some examples, the vehicle 700 may include multiple LiDAR sensors 764 (e.g., two, four, six, etc.) that may use Ethernet (e.g., to provide data to a Gigabit Ethernet switch).

In some examples, the LiDAR sensor(s) 764 may be capable of providing a list of objects and their distances for a 360-degree field of view. Commercially available LiDAR sensor(s) 764 may have an advertised range of approximately 700 m, with an accuracy of 2 cm-3 cm, and with support for a 700 Mbps Ethernet connection, for example. In some examples, one or more non-protruding LiDAR sensors 764 may be used. In such examples, the LiDAR sensor(s) 764 may be implemented as a small device that may be embedded into the front, rear, sides, and/or corners of the vehicle 700. The LiDAR sensor(s) 764, in such examples, may provide up to a 120-degree horizontal and 35-degree vertical field-of-view, with a 200 m range even for low-reflectivity objects. Front-mounted LiDAR sensor(s) 764 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 700. Available 3D flash LiDAR systems include a solid-state 3D staring array LiDAR camera with no moving parts other than a fan (e.g., a non-scanning LiDAR device). The flash LiDAR device may use a 7 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LiDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., may bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-584(H) (collectively referred to herein as GPUs 784), PCIe switches 782(A)-582(H) (collectively referred to herein as PCIe switches 782), and/or CPUs 780(A)-580(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
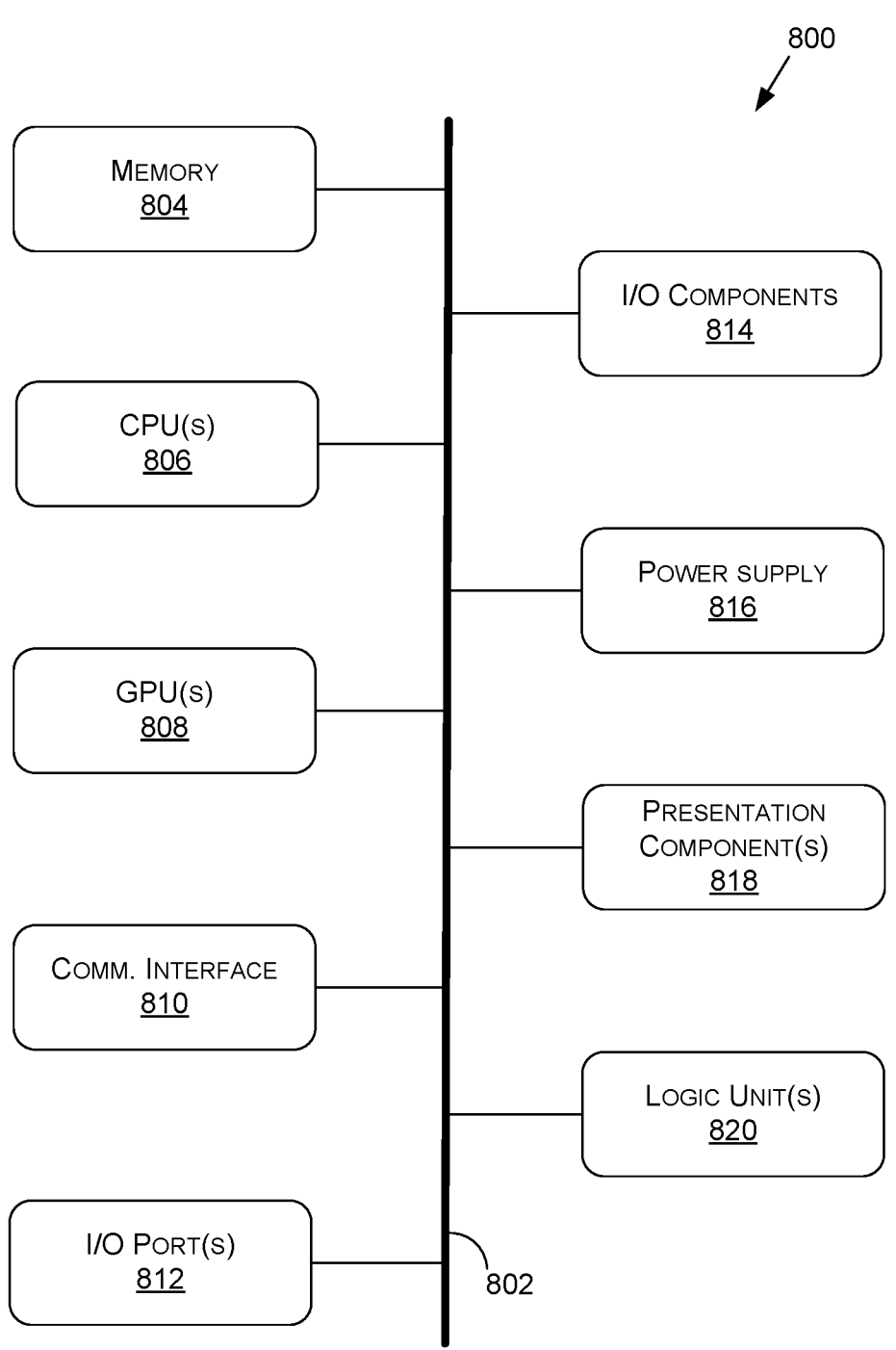
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

In various embodiments, one or more CPU(s) 806, GPU(s) 808, and/or logic unit(s) 820 are configured to execute one or more instances of sensor failure detector 122. Sensor output frames 216 generated by sensor failure detector 122 may then be used by other components to perform additional processing such as planning and control functions.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
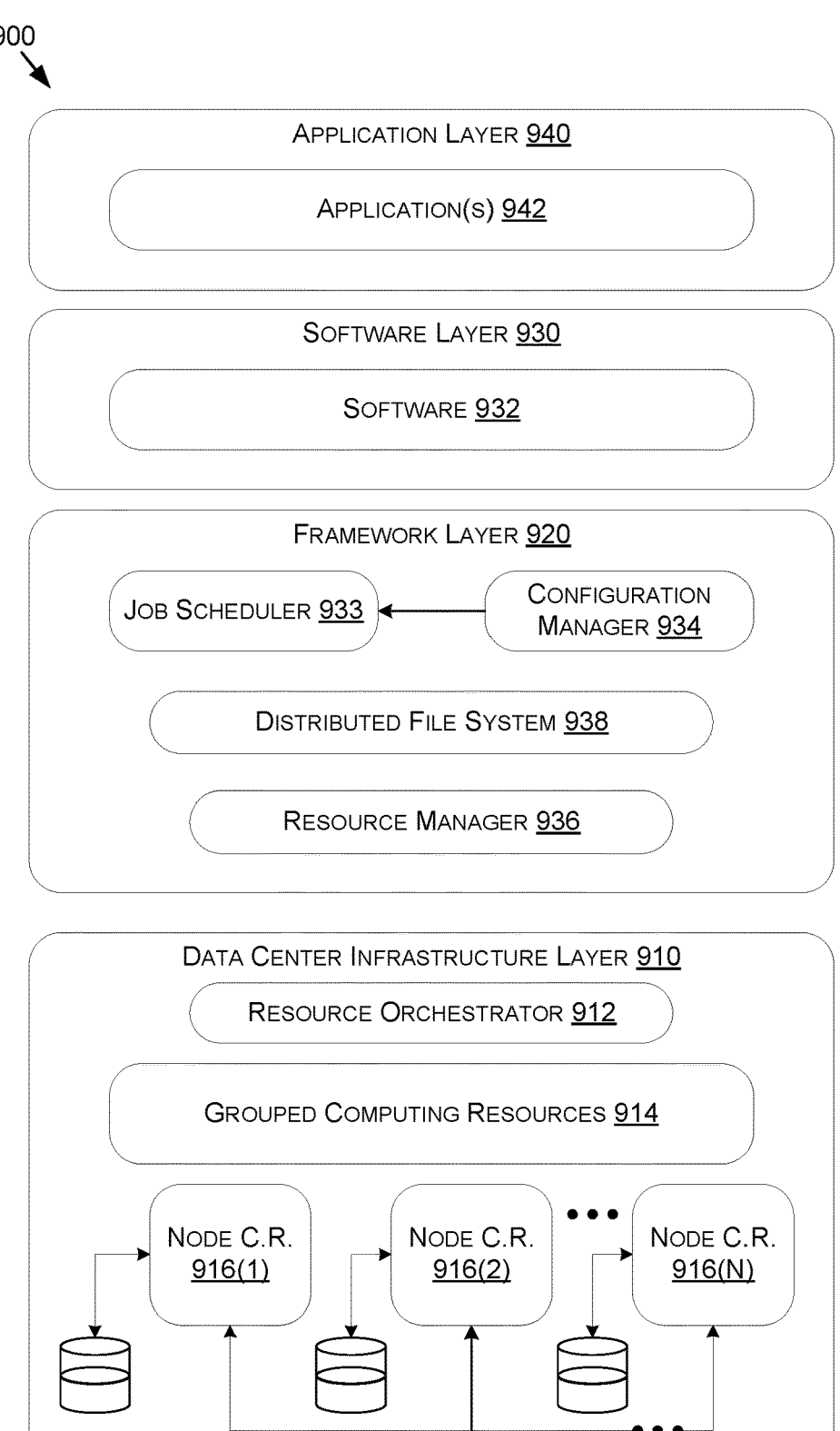
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-716(N), where "N" represents any whole, positive integer. In at least one embodiment, node C.R.s 916(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-716(N) may correspond to a server having one or more of the above-mentioned computing resources. In addition, in some embodiments, the node C.R.s 916(1)-716(N) may include one or more virtual components, such as vGPUs, vCPUs, and/or the like, and/or one or more of the node C.R.s 916(1)-716(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-716(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-716(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-716(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

1. In some embodiments, a method comprises receiving, from a sensor, sensor output data and at least one sensor output setting associated with the sensor output data, determining whether a queue of pending sensor input settings includes a matching sensor input setting that matches the sensor output setting, in response to determining that the queue of pending sensor input settings includes the matching sensor input setting, identifying, in the queue of pending sensor input settings, a pending sensor input setting that precedes the matching sensor input setting in the queue, determining, based at least on a pending request count associated with the pending input setting, whether a sensor setting failure has occurred, in response to determining that the sensor setting failure has occurred, generating an error indication based at least on the pending request count, and modifying one or more downstream operations that rely on the sensor output data based at least on the error indication.

2. The method of clause 1, further comprising in response to identifying the matching sensor input setting, decrementing a pending request count associated with the matching sensor input setting, wherein the pending request count is based at least on a difference between a number of consecutive requests to apply the pending sensor input setting to the sensor and a number of times a corresponding matching sensor output setting has been received from the sensor.

3. The method of clauses 1 or 2, wherein the determining whether the queue of pending sensor input settings includes the matching sensor input setting comprises determining whether the matching sensor input setting matches the sensor output setting in accordance with a threshold tolerance.

4. The method of any of clauses 1-3, wherein the threshold tolerance is based at least on one or more of the matching sensor input setting or the sensor output setting.

5. The method of any of clauses 1-4, further comprising in response to determining that the queue of pending sensor input settings does not include the matching sensor input setting, generating an error indicating that a data corruption error has occurred.

6. The method of any of clauses 1-5, wherein the determining, based at least on a pending request count associated with the pending input setting, whether a sensor setting failure has occurred comprises comparing the pending request count to zero.

7. The method of any of clauses 1-6, wherein the generating the error indication based at least on the pending request count comprises determining a sensor setting failure type based at least on the pending request count.

8. The method of any of clauses 1-7, wherein the sensor setting failure type corresponds to no failure if the pending request count is zero.

9. The method of any of clauses 1-8, wherein the sensor setting failure type corresponds to a sensor settings update delay or a sensor settings drop if the pending request count associated with the pending input setting is less than zero.

10. The method of any of clauses 1-9, wherein the sensor setting failure type corresponds to a sensor settings update delay if the pending request count associated with the pending input setting is less than zero and a next pending request count associated with a next queue element after the pending input setting is zero.

11. The method of any of clauses 1-10, wherein the sensor setting failure type corresponds to a sensor settings drop if the pending request count associated with the pending input setting is less than zero and a next pending request count associated with a next queue element after the pending input setting is greater than zero.

12. The method of any of clauses 1-11, wherein the sensor setting failure type corresponds to a frame drop or a sensor settings drop if the pending request count associated with the pending input setting is greater than zero.

13. The method of any of clauses 1-12, wherein the sensor setting failure type corresponds to a frame drop if the pending request count associated with the pending input setting is greater than zero and a previous pending request count associated with a previous queue element that precedes the pending input in setting is zero.

14. The method of any of clauses 1-13, wherein the sensor setting failure type corresponds to a sensor settings drop if the pending request count associated with the pending input setting is greater than zero and a next pending request count associated with a previous queue element that precedes the pending input setting is less than zero.

15. The method of any of clauses 1-14, further comprising in response to identifying, in the queue of pending sensor input settings, the pending sensor input setting, removing the pending sensor input setting the queue.

16. The method of any of clauses 1-15, wherein the method further comprises receiving an input setting, determining whether the input setting matches a previous setting in the queue of pending settings, and in response to determining that the input setting matches the previous setting, incrementing a pending request count associated with the previous setting.

17. The method of any of clauses 1-16, wherein the method further comprises in response to determining that the input setting does not match the previous setting, adding the pending request count to the tail of the queue.

18. In some embodiments, a processor comprises one or more processing units to perform operations comprising receiving, from a sensor, sensor output data and at least one sensor output setting associated with the sensor output data, determining whether a queue of pending sensor input settings includes a matching sensor input setting that matches the sensor output setting, in response to determining that the queue of pending sensor input settings includes the matching sensor input setting, identifying, in the queue of pending sensor input settings, a pending sensor input setting that precedes the matching sensor input setting in the queue, determining, based at least on a pending request count associated with the pending input setting, whether a sensor setting failure has occurred, and in response to determining that the sensor setting failure has occurred, generating an error indication based at least on the pending request count.

19. The processor of clause 18, wherein the processor is comprised in at least one of a control system for an autonomous or semi-autonomous machine, a perception system for an autonomous or semi-autonomous machine, a system for performing one or more simulation operations, a system for performing one or more digital twin operations, a system for performing light transport simulation, a system for performing collaborative content creation for 3D assets, a system for performing one or more deep learning operations, a system implemented using an edge device, a system for generating or presenting at least one of virtual reality content, augmented reality content, or mixed reality content, a system implemented using a robot, a system for performing one or more conversational AI operations, a system for performing one or more generative AI operations, a system implementing one or more large language models (LLMs), a system for generating synthetic data, a system incorporating one or more virtual machines (VMs), a system implemented at least partially in a data center, or a system implemented at least partially using cloud computing resources.

20. In some embodiments, a system comprises one or more processing units to perform operations comprising receiving, from a sensor, sensor output data and at least one sensor output setting associated with the sensor output data, determining whether a queue of pending sensor input settings includes a matching sensor input setting that matches the sensor output setting, in response to determining that the queue of pending sensor input settings includes the matching sensor input setting, identifying, in the queue of pending sensor input settings, a pending sensor input setting that precedes the matching sensor input setting in the queue, determining, based at least on a pending request count associated with the pending input setting, whether a sensor setting failure has occurred, and in response to determining that the sensor setting failure has occurred, generating an error indication based at least on the pending request count.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
   configuring a sensor based at least on sensor input settings;
   modifying, in a queue of pending sensor input settings, a pending request count associated with the sensor input settings;

receiving, from the sensor, sensor output data and at least one sensor output setting associated with the sensor output data;
   determining whether the queue of pending sensor input settings includes a matching sensor input setting that matches the sensor output setting;
   in response to determining that the queue of pending sensor input settings includes the matching sensor input setting, identifying, in the queue of pending sensor input settings, a pending sensor input setting that precedes the matching sensor input setting in the queue;
   determining, based at least on a second pending request count associated with the pending sensor input setting, whether a sensor setting failure has occurred;
   in response to determining that the sensor setting failure has occurred, generating an error indication based at least on the second pending request count; and
   modifying one or more downstream operations that rely on the sensor output data based at least on the error indication.

2. The method of claim 1, further comprising:
   in response to identifying the matching sensor input setting, decrementing a pending request count associated with the matching sensor input setting, wherein the pending request count is based at least on a difference between a number of consecutive requests to apply the pending sensor input setting to the sensor and a number of times a corresponding matching sensor output setting has been received from the sensor.

3. The method of claim 1, wherein the determining whether the queue of pending sensor input settings includes the matching sensor input setting comprises determining whether the matching sensor input setting matches the sensor output setting in accordance with a threshold tolerance.

4. The method of claim 3, wherein the threshold tolerance is based at least on one or more of the matching sensor input setting or the sensor output setting.

5. The method of claim 1, further comprising:
   in response to determining that the queue of pending sensor input settings does not include the matching sensor input setting, generating an error indicating that a data corruption error has occurred.

6. The method of claim 1, wherein the determining, based at least on a pending request count associated with the pending sensor input setting, whether a sensor setting failure has occurred comprises comparing the pending request count to zero.

7. The method of claim 1, wherein the generating the error indication based at least on the pending request count comprises determining a sensor setting failure type based at least on the pending request count.

8. The method of claim 7, wherein the sensor setting failure type corresponds to no failure if the pending request count is zero.

9. The method of claim 7, wherein the sensor setting failure type corresponds to a sensor settings update delay or a sensor settings drop if the pending request count associated with the pending sensor input setting is less than zero.

10. The method of claim 7, wherein the sensor setting failure type corresponds to a sensor settings update delay if the pending request count associated with the pending sensor input setting is less than zero and a next pending request count associated with a next queue element after the pending sensor input setting is zero.

11. The method of claim 7, wherein the sensor setting failure type corresponds to a sensor settings drop if the pending request count associated with the pending sensor input setting is less than zero and a next pending request count associated with a next queue element after the pending sensor input setting is greater than zero.

12. The method of claim 7, wherein the sensor setting failure type corresponds to a frame drop or a sensor settings drop if the pending request count associated with the pending sensor input setting is greater than zero.

13. The method of claim 7, wherein the sensor setting failure type corresponds to a frame drop if the pending request count associated with the pending sensor input setting is greater than zero and a previous pending request count associated with a previous queue element that precedes the pending input in setting is zero.

14. The method of claim 7, wherein the sensor setting failure type corresponds to a sensor settings drop if the pending request count associated with the pending sensor input setting is greater than zero and a next pending request count associated with a previous queue element that precedes the pending sensor input setting is less than zero.

15. The method of claim 1, further comprising:

in response to identifying, in the queue of pending sensor input settings, the pending sensor input setting, removing the pending sensor input setting from the queue.

16. The method of claim 1, wherein the method further comprises:

receiving an input setting;

determining whether the input setting matches a previous setting in the queue of pending settings; and in response to determining that the input setting matches the previous setting, incrementing a pending request count associated with the previous setting.

17. The method of claim 16, wherein the method further comprises:

in response to determining that the input setting does not match the previous setting, adding the pending request count to the tail of the queue.

18. A processor comprising:

one or more processing units to perform operations comprising:

configuring a sensor based at least on sensor input settings;

modifying, in a queue of pending sensor input settings, a pending request count associated with the sensor input settings;

receiving, from the sensor, sensor output data and at least one sensor output setting associated with the sensor output data;

determining whether the queue of pending sensor input settings includes a matching sensor input setting that matches the sensor output setting;

in response to determining that the queue of pending sensor input settings includes the matching sensor input setting, identifying, in the queue of pending sensor input settings, a pending sensor input setting that precedes the matching sensor input setting in the queue;

determining, based at least on a second pending request count associated with the pending sensor input setting, whether a sensor setting failure has occurred;

in response to determining that the sensor setting failure has occurred, generating an error indication based at least on the second pending request count; and modifying one or more downstream operations that rely on the sensor output data based at least on the error indication.

19. The processor of claim 18, wherein the processor is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system for generating or presenting at least one of virtual reality content, augmented reality content, or mixed reality content;

a system implemented using a robot;

a system for performing one or more conversational AI operations;

a system for performing one or more generative AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

20. A system comprising:

one or more processing units to perform operations comprising:

configuring a sensor based at least on sensor input settings;

modifying, in a queue of pending sensor input settings, a pending request count associated with the sensor input settings;

receiving, from the sensor, sensor output data and at least one sensor output setting associated with the sensor output data;

determining whether the queue of pending sensor input settings includes a matching sensor input setting that matches the sensor output setting;

in response to determining that the queue of pending sensor input settings includes the matching sensor input setting, identifying, in the queue of pending sensor input settings, a pending sensor input setting that precedes the matching sensor input setting in the queue;

determining, based at least on a second pending request count associated with the pending sensor input setting, whether a sensor setting failure has occurred;

in response to determining that the sensor setting failure has occurred, generating an error indication based at least on the second pending request count; and modifying one or more downstream operations that rely on the sensor output data based at least on the error indication.

* * * * *